(12) United States Patent
Inoue

(10) Patent No.: US 7,954,917 B2
(45) Date of Patent: Jun. 7, 2011

(54) EXPOSURE DEVICE, EXPOSURE SYSTEM, LIGHT-EMITTING ELEMENT CIRCUIT BOARD AND IMAGE FORMING APPARATUS

(75) Inventor: Michihiro Inoue, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1033 days.

(21) Appl. No.: 11/785,171

(22) Filed: Apr. 16, 2007

(65) Prior Publication Data

US 2008/0079025 A1    Apr. 3, 2008

(30) Foreign Application Priority Data

Sep. 29, 2006 (JP) ............................... P2006-269641

(51) Int. Cl.
*B41J 29/38* (2006.01)
(52) U.S. Cl. ................................ 347/9; 347/5; 347/237
(58) Field of Classification Search .................... 347/13, 347/42, 1–12, 237–238
See application file for complete search history.

(56) References Cited

U.S. PATENT DOCUMENTS

| | | | | |
|---|---|---|---|---|
| 5,200,763 | A * | 4/1993 | Tanuma et al. | 347/237 |
| 5,739,837 | A | 4/1998 | Nagahata et al. | 347/200 |
| 6,559,879 | B1 | 5/2003 | Kobayashi et al. | |
| 2004/0125157 | A1 * | 7/2004 | Edelen et al. | 347/9 |

FOREIGN PATENT DOCUMENTS

| | | |
|---|---|---|
| CN | 1249994 A | 4/2000 |
| JP | 04-023367 | 1/1992 |
| JP | 2683781 | 8/1997 |
| JP | 11-157117 | 6/1999 |
| JP | 11-198429 | 7/1999 |
| JP | 2000-183403 | 6/2000 |
| JP | 2005-53145 | 3/2005 |
| KR | 1993-0010643 A | 6/1993 |
| KR | 10-0580206 B1 | 5/2006 |

* cited by examiner

*Primary Examiner* — Lam S Nguyen
(74) *Attorney, Agent, or Firm* — Morgan, Lewis & Bockius LLP

(57) ABSTRACT

An exposure device includes a circuit board, a light-emitting element member, a driving signal generating unit and a first voltage supply unit. The light-emitting element member is disposed on the circuit board. The light-emitting element includes plural light-emitting elements arranged in a line and plural switching elements disposed so as to correspond to the plural light-emitting elements. When the plural switching elements sequentially set the respective light-emitting elements to be in a state where the respective light-emitting elements can turn on, the respective light-emitting elements turn on sequentially. The driving signal generating unit is disposed on the circuit board. The driving signal generating unit generates driving signals for driving the respective light-emitting elements arranged in the light-emitting element member. The first voltage supply unit is disposed on the circuit board. The voltage supply unit supplies a first predetermined voltage to the light-emitting element member.

15 Claims, 15 Drawing Sheets

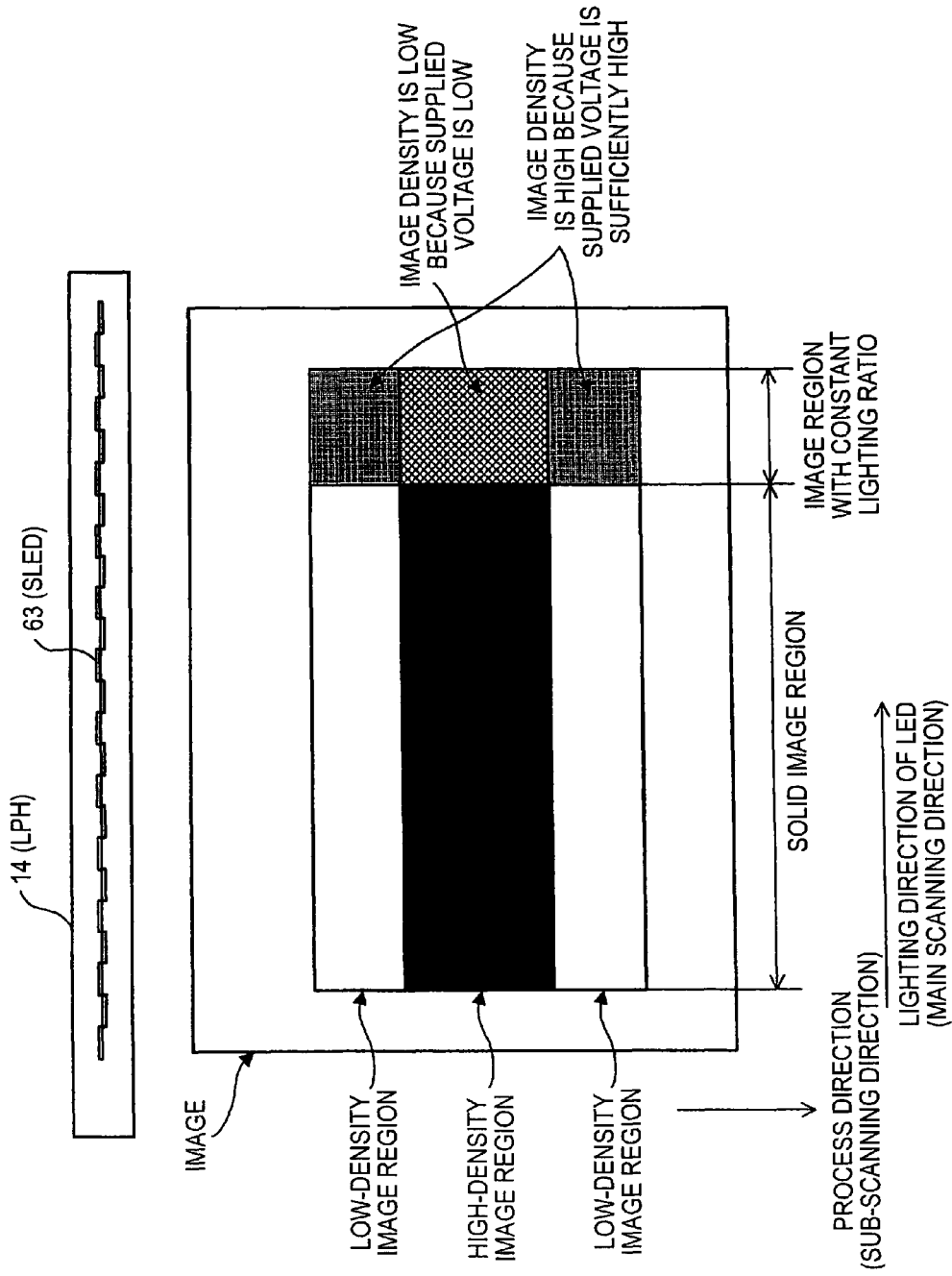

HEAT RADIATING PATH

US 7,954,917 B2

EXPOSURE DEVICE, EXPOSURE SYSTEM, LIGHT-EMITTING ELEMENT CIRCUIT BOARD AND IMAGE FORMING APPARATUS

CROSS-REFERENCE TO RELATED APPLICATIONS

This application is based on and claims priority under 35 U.S.C. §119 from Japanese Patent Application No. 2006-269641 filed Sep. 29, 2006.

BACKGROUND

1. Technical Field

The invention relates to an exposure device for performing an optical writing operation in an image forming apparatus such as a printer or a copier.

2. Related Art

In general, a power cable for supplying power to the exposure device from a power source has impedance therein. Accordingly, when an amount of current consumed in the exposure device varies due to the impedance of the power cable, a voltage supplied to the exposure device varies and thus light intensity of the light-emitting elements varies.

SUMMARY

According to an aspect of the invention, an exposure device includes a circuit board, a light-emitting element member, a driving signal generating unit and a first voltage supply unit. The light-emitting element member is disposed on the circuit board. The light-emitting element includes plural light-emitting elements arranged in a line and plural switching elements disposed so as to correspond to the plural light-emitting elements. When the plural switching elements sequentially set the respective light-emitting elements to be in a state where the respective light-emitting elements can turn on, the respective light-emitting elements turn on sequentially. The driving signal generating unit is disposed on the circuit board. The driving signal generating unit generates driving signals for driving the respective light-emitting elements arranged in the light-emitting element member. The first voltage supply unit is disposed on the circuit board. The voltage supply unit supplies a first predetermined voltage to the light-emitting element member.

BRIEF DESCRIPTION OF THE DRAWINGS

Exemplary embodiments will be described in detail below with reference to the accompanying drawings, wherein:

FIG. 11 is a diagram illustrating a variation in light intensity occurring in the SLED due to an influence of impedance of the power harness;

DETAILED DESCRIPTION

Hereinafter, exemplary embodiments of the invention will be described in detail with reference to the accompanying drawings.

Figure 1:
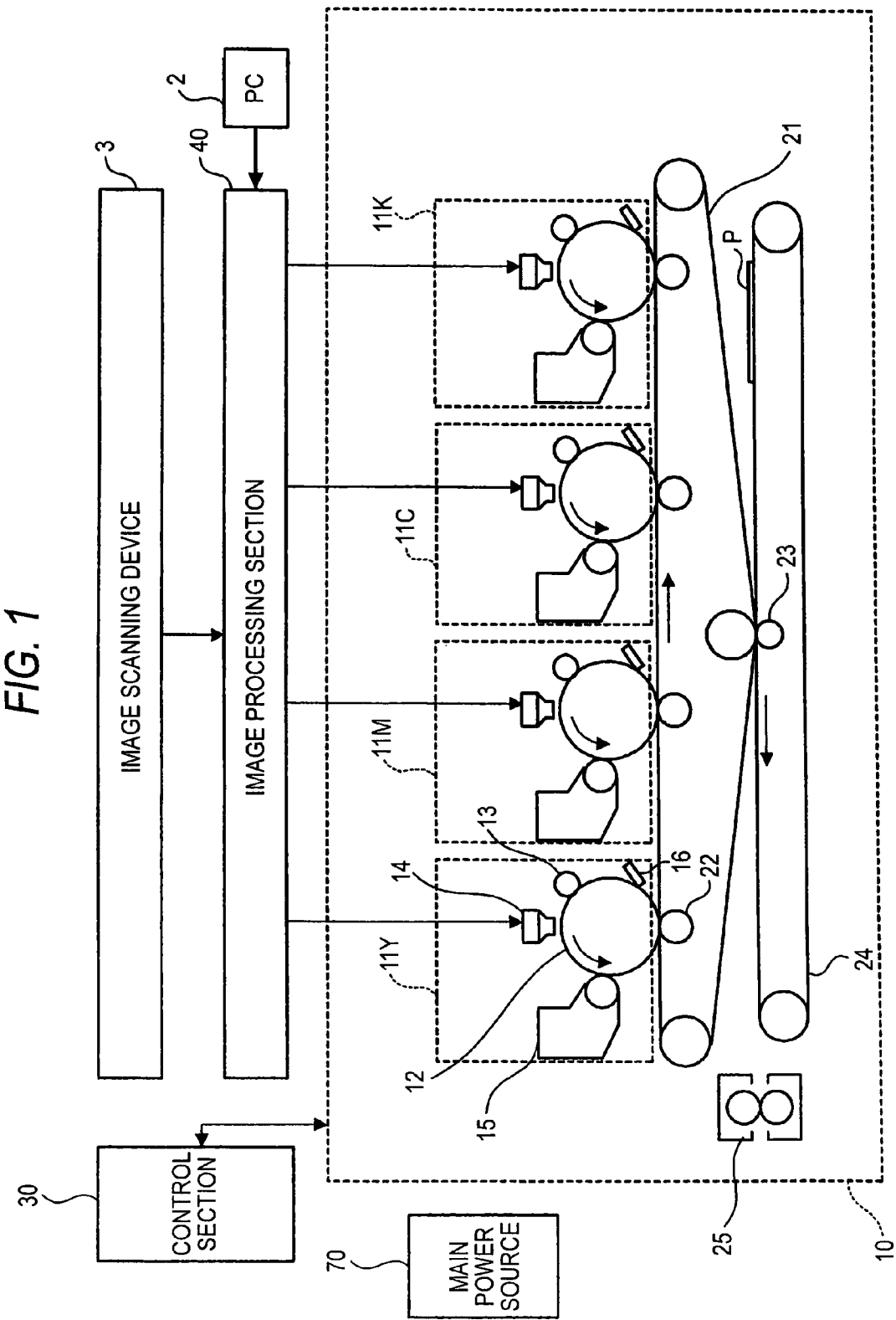
FIG. 1 is a diagram illustrating the entire configuration of an image forming apparatus having a print head which is an example of an exposure device according to an exemplary embodiment of the invention.

FIG. 1 is a diagram illustrating the entire configuration of an image forming apparatus having a print head which is an example of an exposure device according to an exemplary embodiment of the invention. The image forming apparatus shown in FIG. 1 is a so-called tandem digital color printer and includes an image forming process section 10 which serves as an image forming section for forming images corresponding to image data of colors, a control section 30 which controls operations of the image forming apparatus, an image processing section 40 which is connected to an external device such as a personal computer (PC) 2 or an image scanning device 3 and which performs a predetermined image process for image data received from the personal computer (PC) 2 or the image scanning device 3, and a main power source 70 which serves as power supply unit for supplying power to each section.

The image forming process section 10 has four image forming units 11Y, 11M, 11C, and 11K (hereinafter, simply referred to as "image forming unit 11") disposed in parallel with a constant gap therebetween. Each image forming unit 11 includes a photosensitive drum 12 as an image carrier which forms an electrostatic latent image and carries a toner image, a charging device 13 which uniformly charges the surface of the photosensitive drum 12 with a predetermined potential, an LED print head (LPH) 14 employing a light-emitting diode as an exposure device (exposure means) which exposes the photosensitive drum 12 charged by the charging device 13 to light on the basis of image data, a developing device 15 which develops the electrostatic latent image formed on the photosensitive drum 12, and a cleaner 16 which cleans the surface of the photosensitive drum 12 after transfer.

Here, the image forming units 11 have the same configuration except for toners stored in the developing devices 15. The image forming units 11 form toner images of yellow (Y), magenta (M), cyan (C), and black (K), respectively.

The image forming process section 10 includes an intermediate transfer belt 21 to which toner images of various colors formed on the photosensitive drums 12 of the image forming units 11 are multiply transferred, a first transfer roll 22 which sequentially transfers (first transfers) the toner images of various colors of the image forming units 11 to the intermediate transfer belt 21, a second transfer roll 23 which collectively transfers (second transfer) overlapped toner images transferred to the intermediate transfer belt 21 to a sheet of paper P as a printing medium (printing sheet), and a fixing device 25 which fixes the second transferred image onto the sheet of paper P.

In the image forming apparatus according to this exemplary embodiment, the image forming process section 10 performs an image forming operation on the basis of control signals such as synchronization signals supplied from the control section 30. At this time, the image data input from the PC 2 or the image scanning device 3 are processed by the image processing section 40 and are then supplied to the image forming units 11 through an interface. For example, in the yellow image forming unit 11Y, the surface of the photosensitive drum 12 uniformly charged with a predetermined potential by the charging device 13 is exposed to light by the LPH 14 lighted on the basis of the image data acquired from the image processing section 40, thereby forming an electrostatic latent image on the photosensitive drum 12. The formed electrostatic latent image is developed by the developing device 15, thereby forming a yellow (Y) toner image on the photosensitive drum 12. Similarly, the color toner images of magenta (M), cyan (C), and black (K) are formed in the image forming units 11M, 11C, and 11K, respectively.

The color toner images formed in the image forming units 11 are sequentially electrostatically sucked onto the intermediate transfer belt 21 rotating in the direction of an arrow shown in FIG. 1 by the first transfer roll 22, thereby forming overlapped toner images on the intermediate transfer belt 21. The overlapped toner images are transported to a region (second transfer section) provided with the second transfer roll 23 with the movement of the intermediate transfer belt 21. When the overlapped toner images are transported to the second transfer section, the sheet of paper P is supplied to the second transfer section in synchronization with the transport of the toner images to the second transfer section. Then, in the second transfer section, the overlapped toner images are electrostatically transferred to the transported sheet of paper P in a bundle by means of a transfer electric field formed by the second transfer roll 23.

Thereafter, the sheet of paper P to which the overlapped toner images are electrostatically transferred is separated from the intermediate transfer belt 21 and is transported to the fixing device 25 by a transport belt 24. The non-fixed toner images on the sheet of paper P are fixed to the sheet of paper P by means of a fixing process of the fixing device 25 using heat and pressure. The sheet of paper P on which the fixed image is formed is transported to a discharged paper tray (not shown) disposed in a discharge section of the image forming apparatus.

Figure 2:
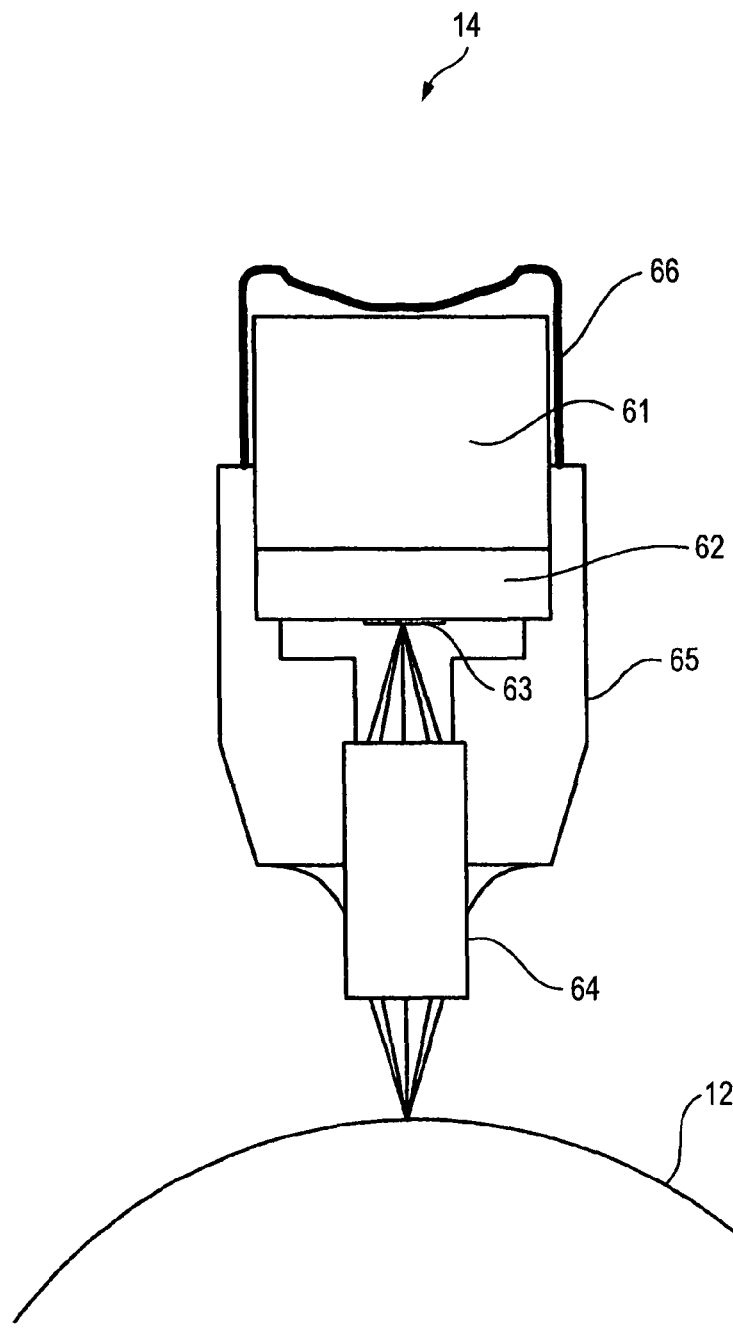
FIG. 2 is a diagram illustrating the configuration of an LED print head (LPH)

FIG. 2 is a diagram illustrating the configuration of the LED print head (LPH) 14 serving as the exposure device. In FIG. 2, the LPH 14 includes a housing 61 serving as a supporting member, a self-scanning LED array (SLED) 63 serving as an example of a light-emitting element member, an LED circuit board 62 on which mounted are the SLED 63 and a signal generating circuit 100 (shown in FIG. 3) which is an example of a driving signal generating unit generating a driving signal for driving the SLED 63, a rod lens array 64 serving as an optical member for focusing light from the SLED 63 onto the surface of the photosensitive drum 12, a holder 65 holding the rod lens array 64 and shielding the SLED 63 from the outside, and a leaf spring 66 pressing the housing 61 toward the rod lens array 64.

The housing 61 is formed of a metal block or a sheet metal of aluminum and SUS having excellent heat conductivity and serves to support the LED circuit board 62 and radiate heat from the LED circuit board. The holder 65 supports the housing 61 and the rod lens array 64 and sets a light-emitting point of the SLED 63 and a focus of the rod lens array 64 so as to be matched with each other. In addition, the holder 65 hermetically seals the SLED 63, thereby preventing the external attachment of dust to the SLED 63. On the other hand, the leaf spring 61 presses the LED circuit board 62 toward the rod lens array 64 through the housing 61 so as to maintain the positional relation between the SLED 63 and the rod lens array 64.

The LPH 14 having the above-mentioned configuration is movable in the optical axis direction of the rod lens array 64 with an adjustment screw (not shown) and the image forming position (focusing position) of the rod lens array 64 is adjusted to a position on the surface of the photosensitive drum 12.

Figure 3:
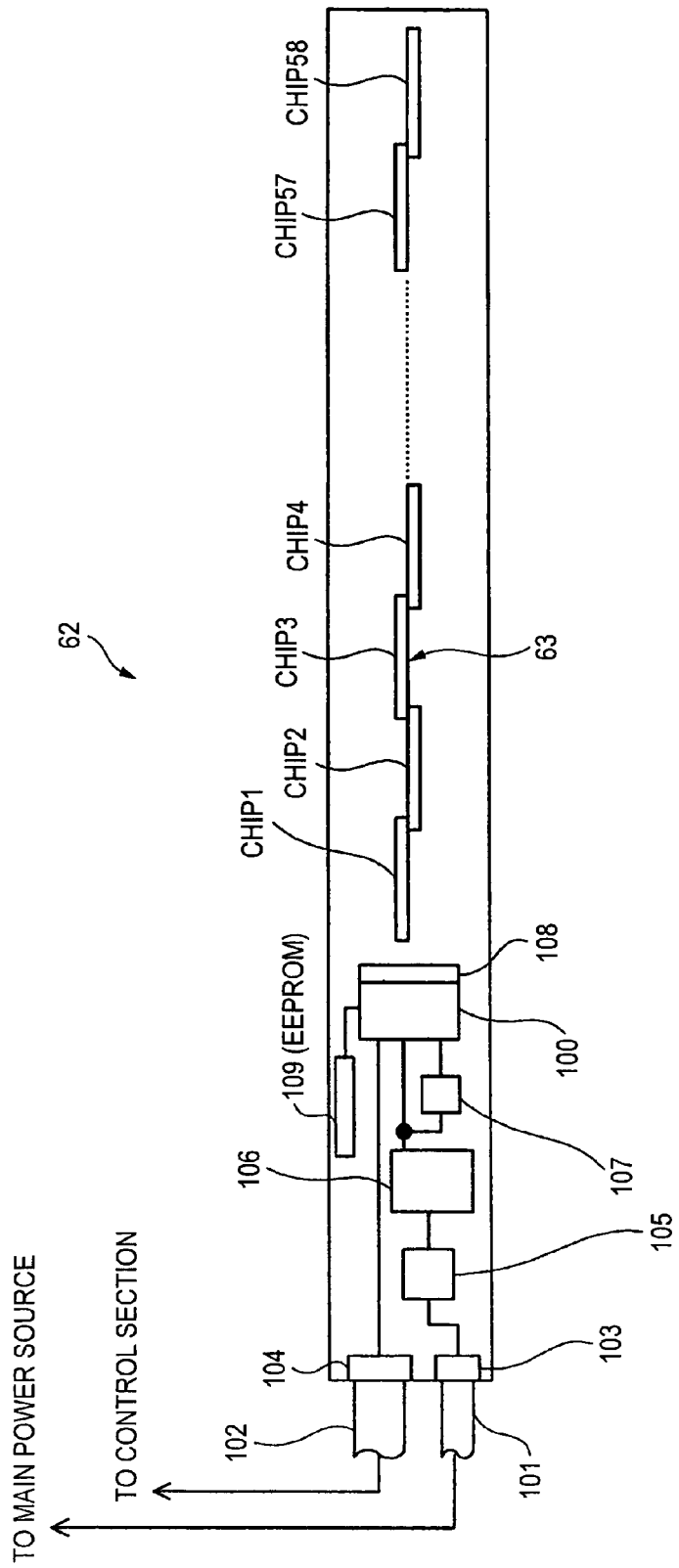
FIG. 3 is a plan view illustrating an LED circuit board.

As shown in FIG. 3 (which is a plan view of the LED circuit board 62), in the LED circuit board 62, the SLED 63 including, for example, 58 SLED chips (CHIP1 to CHIP58) is arranged in a line shape with high precision so as to be parallel to the axial direction of the photosensitive drum 12. In the LPH 14 according to this exemplary embodiment, the SLED chips (CHIP1 to CHIP58) are arranged in a zigzag shape so that the LED arrays are arranged continuous in the connections between the SLED chips at boundaries between arrays (LED arrays) of the light-emitting elements (LED) disposed in the SLED chips (CHIP1 to CHIP58).

The LED circuit board 62 includes a signal generating circuit 100, a level shift circuit 108, a power supply connector 103 connected to a power harness 101 as an example of a power cable for supplying power from the main power source 70, a signal connector 104 connected to a signal harness 102 for transmitting signals between the control section 30 and the image processing section 40, a common-mode choke coil 105 as an example of a noise reducing unit which reduces a noise in current, a primary voltage regulator 106 as an example of a first voltage supply unit which stably converts, for example, a voltage of 5 V supplied from the power harness 101 into a voltage of 3.3 V, and a secondary voltage regulator 107 as an example of a second voltage supply unit which stably converts, for example, a voltage of 3.3 V supplied from the primary voltage regulator 106 into a voltage of 1.8 V.

The LED circuit board 62 is provided with an EEPROM 109 storing light-intensity correction data of the SLED 63.

In a conventional LED print head, an LED array chip and a driving IC chip are connected by wire boding. Since the number of the LED array chips, the number of the driving IC chips and the number of the wire bodings are equal to each other, an area of the LED circuit board increases as density of the LED arrays grows. To the contrary, this application employs the SLED 63 which performs self scanning-type driving as the light-emitting element member, the number of the driving IC chips and the number of the wire bondings are reduced drastically and unused space can be provided on the LED circuit board 62. Thus, it becomes possible to dispose members other than the LED chip arrays and the driving IC chips, that is, the voltage regulators on the same LED circuit board 62.

Figure 4:
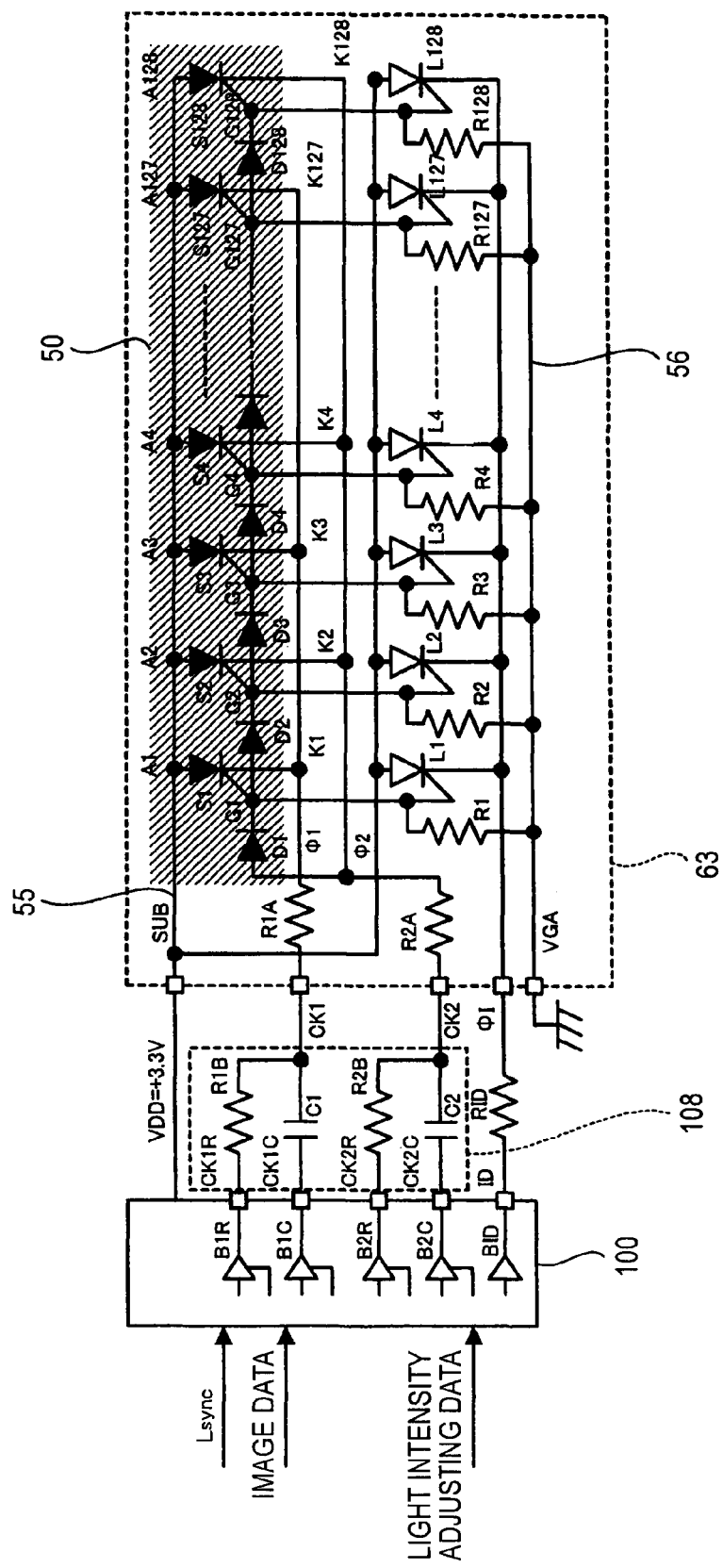
FIG. 4 is a diagram illustrating the circuit configurations of an SLED and a level shift circuit.

Here, as shown in FIG. 4 (which is a diagram illustrating the circuit configurations of the SLED 63 and the level shift circuit 108), the SLED 63 disposed on the LED circuit board 62 include 128 thyristors S1 to S128 serving as switching elements, 128 LEDs L1 to L128 serving as light-emitting elements, 128 diodes D1 to D128, 128 resistors R1 to R128, and transmission current restricting resistors R1A and R2A that prevent excessive current from flowing in signal lines Φ1 and Φ2.

The SLED 63 according to this exemplary embodiment shown in FIG. 4 is, for example, an SLED chip with a resolution of 600 dpi (dot per inch). As shown in FIG. 3, 58 SLED chips (CHIP1 to CHIP58) are arranged in series in the SLED 63 according to this exemplary embodiment. Of the 58 SLED chips, only one SLED chip and signal lines connected thereto are shown in FIG. 4. For the purpose of convenience, the SLED chip may be referred to as the "SLED 63" in the following description.

In the SLED 63 shown in FIG. 4, anode terminals (input terminals) A1 to A128 of the thyristors S1 to S128 are connected to a power supply line 55. The power supply line 55 is supplied with a driving voltage VDD (VDD=+3.3 V). That is, the SLED 63 has a positive-voltage driven configuration which stably operates with a predetermined driving voltage VDD.

A transmission signal CK1 from the signal generating circuit 100 and the level shift circuit 108 is transmitted to cathode terminals (output terminals) K1, K3, . . . , and K127 of the odd thyristors S1, S3, . . . , and S127 through the transmission current restricting resistor R1A. A transmission signal CK2 from the signal generating circuit 100 and the level shift circuit 108 is transmitted to cathode terminals (output terminals) K2, K4, . . . , and K128 of the even thyristors S2, S4, . . . , and S128 through the transmission current restricting resistor R2A.

On the other hand, the gate terminals (control terminals) G1 to G128 of the thyristors S1 to S128 are connected to a power supply line 56 through the resistors R1 to R128 provided correspondingly to the thyristors S1 to S128. The power supply line 56 is grounded (GND).

The gate terminals G1 to G128 of the thyristors S1 to S128 are connected to the gate terminals of the LEDs L1 to L128 provided correspondingly to the thyristors S1 to S128, respectively.

The gate terminals G1 to G128 of the thyristors S1 to S128 are connected to the cathode terminals of the diodes D1 to D128, respectively. The gate terminals G1 to G127 of the thyristors S1 to S127 are connected to the anode terminals of the diodes D2 to D128 at the next stages, respectively. That is, the diodes D1 to D128 are connected in series to each other with sandwiching the gate terminals G1 to G127 therebetween, respectively.

The anode terminal of the diode D1 is connected to the signal generating circuit 100 through the transmission current restricting resistor R2A and the level shift circuit 108 and receives the transmission signal CK2. The cathode terminals of the LED L1 to L128 are connected to the signal generating circuit 100 and receive the lighting signal φI.

A light-shielding mask 50 is disposed in the SLED 63 so as to cover the thyristors S1 to S128 and the diodes D1 to D128. This is provided to block light from the thyristors S1 to S128 in a state where current flows or the diodes D1 to D128 in the state where current flows in the course of performing an image forming process, thereby suppressing unnecessary light from exposing the photosensitive drum 12.

As shown in FIG. 4, the level shift circuit 108 disposed on the LED circuit board 62 has a configuration where a resistor R1B and a capacitor C1 are connected in parallel to each other and a resistor R2B and a capacitor C2 are connected in parallel to each other. One end of each of the resistors R1B, R2B and capacitors C1, C2 is connected to an input terminal the SLED 63 and the other end of each of the resistors R1B, R2B and capacitors C1, C2 is connected to an output terminal of the signal generating circuit 100.

Figure 5:
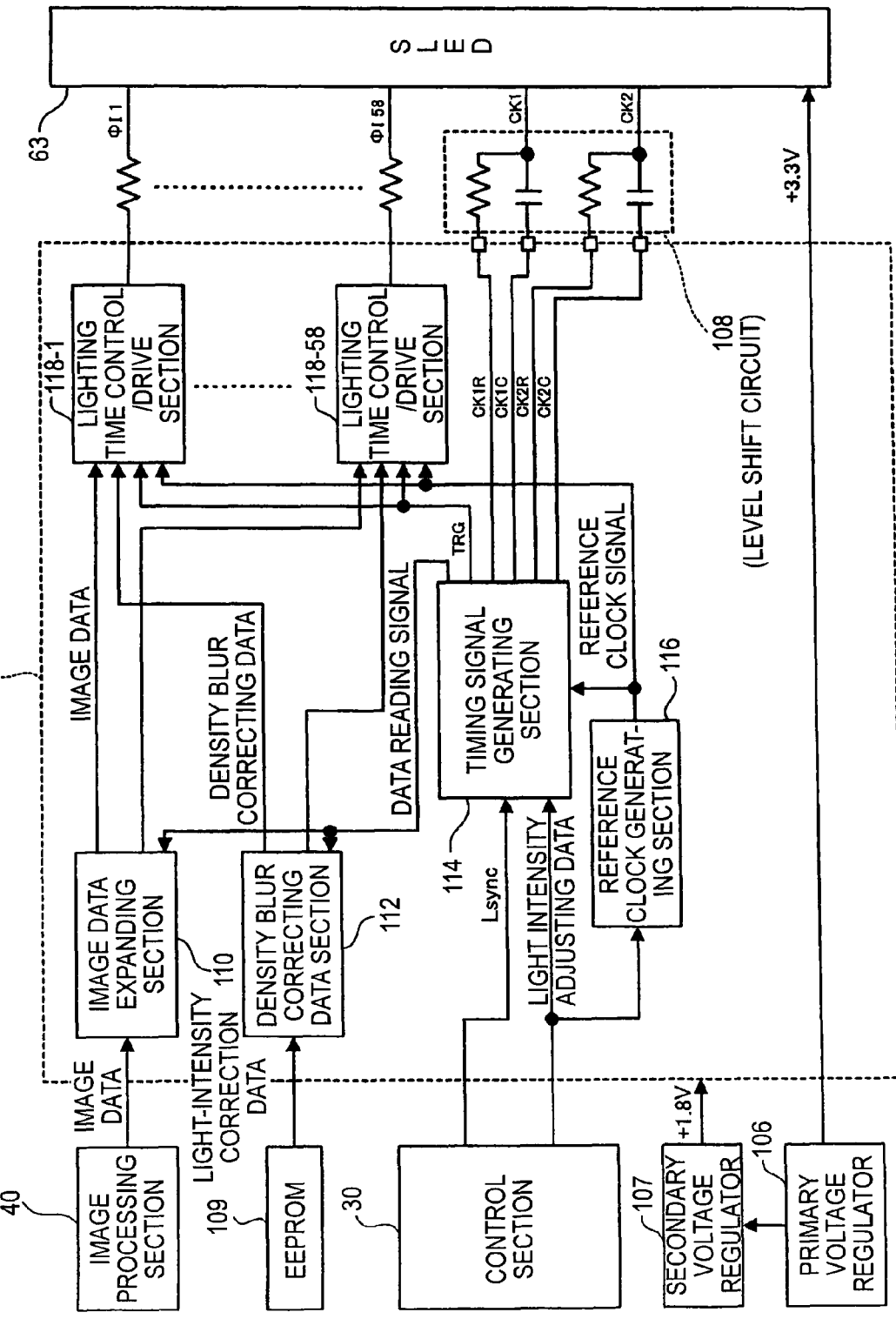
FIG. 5 is a block diagram illustrating the configuration of a signal generating circuit.

Next, as shown in FIG. 5 (which is a block diagram illustrating a configuration of the signal generating circuit 100), the signal generating circuit 100 disposed on the LED circuit board 62 mainly includes an image data expanding section 110, a density blur correcting data section 112, a timing signal generating section 114, a reference clock generating section 116, and a lighting time control/drive section 118 (118-1 to 118-58).

The image data expanding section 110 is serially supplied with image data from the image processing section 40 and performs a process of dividing the supplied image data into image data which are only transmitted to each SLED chip (CHIP1 to CHIP58), like first to 128-th dots, 129-th to 256-th dots, and 7297-th to 7424-th dots. The image data expanding section 110 outputs the divided image data to the lighting time control/drive sections 118-1 to 118-58.

The density blur correcting data section 112 stores density blur correcting data for correcting a deviation of light intensity every LED in the SLED 63. The density blur correcting data section 112 outputs the density blur correcting data to the lighting time control/drive sections 118-1 to 118-58. The density blur correcting data are data set for each LED and include, for example, 8-bit (0 to 255) data.

Light-intensity correction data of each LED calculated in advance at the time of manufacturing the LPH 14 or data for correcting other density blurs as needed are stored in the EEPROM 109 disposed on the LED circuit board 62. At the time of supplying power to the apparatus, the light-intensity correction data of each LED or the like are downloaded to the density blur correcting data section 112 from the EEPROM 109. The density blur correcting data section 112 generates the density blur correcting data on the basis of the acquired light-intensity correction data of each LED and on the basis of the light-intensity correction data and other data as needed and outputs the generated density blur correcting data to the lighting time control/drive section 118-1 to 118-58.

The reference clock generating section 116 is connected to the control section 30, the timing signal generating section 114, and the lighting time control/drive sections 118-1 to 118-58.

Figure 6:
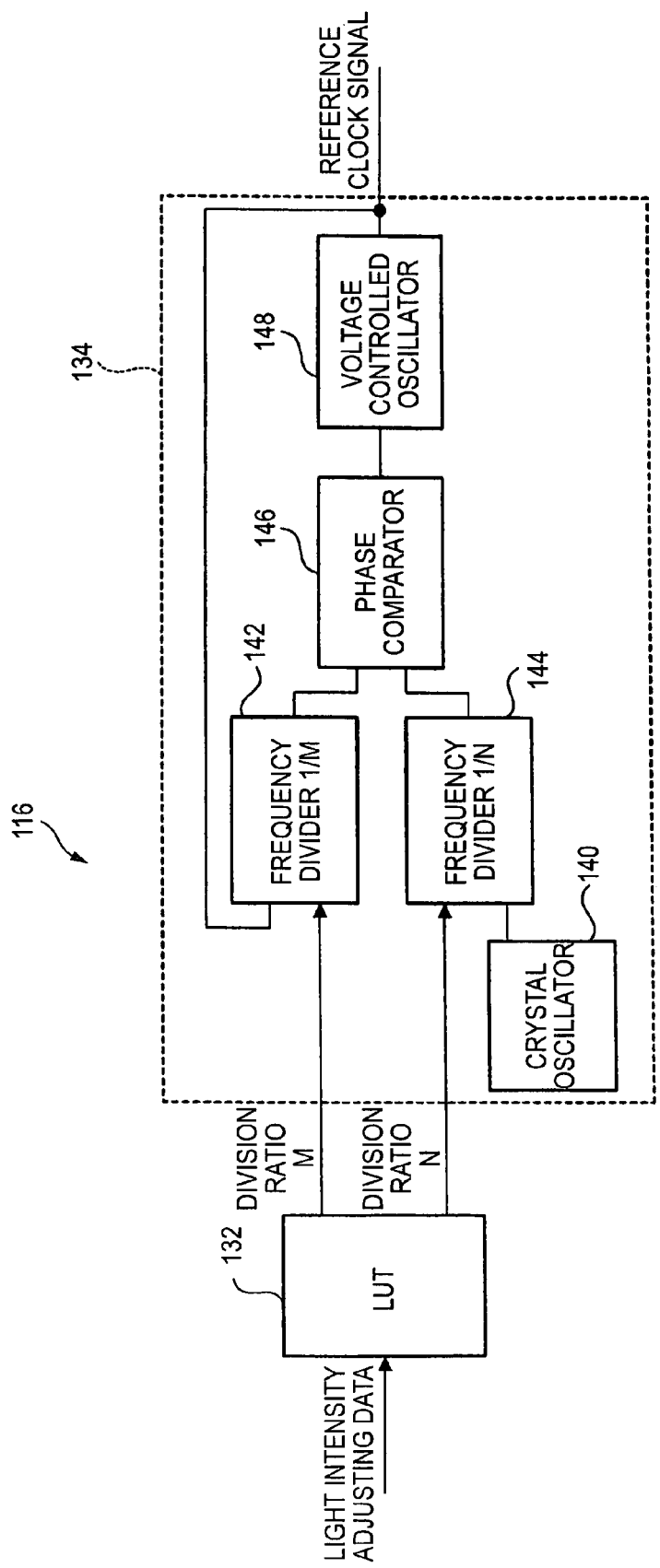
FIG. 6 is a block diagram illustrating the configuration of a reference clock generating section.

As shown in FIG. 6 (which is a block diagram illustrating a configuration of the reference clock generating section 116), the reference clock generating section 116 includes a PLL circuit 134 having a crystal oscillator 140, a frequency divider 1/M 142, a frequency divider 1/N 144, a phase comparator 146, and a voltage controlled oscillator 148 and a lookup table (LUT) 132. A table for determining division ratios M and N on the basis of the light intensity adjusting data from the control section 30 is stored in the LUT 132. The crystal oscillator 140 is connected to the frequency divider 1/N 144 and serves to oscillate at a predetermined frequency and to output the oscillated signal to the frequency divider 1/N 144. The frequency divider 1/N 144 is connected to the LUT 132 and the phase comparator 146 and serves to divide the frequency of the signal oscillated by the crystal oscillator 140 on the basis of the division ratio N determined from the light intensity adjusting data from the LUT 132. The phase comparator 146 is connected to the frequency divider 1/M 142, the frequency divider 1/N 144, and the voltage controlled oscillator 148 and compares the output signal of the frequency divider 1/N 144 with the output signal of the frequency divider 1/M 142. A control voltage to be supplied to the voltage controlled oscillator 148 is controlled in accordance with the comparison result (phase difference) of the phase comparator 146. The voltage controlled oscillator 148 outputs a clock signal at a frequency based on the control voltage. In this exemplary embodiment, the voltage controlled oscillator 148 is supplied with the control voltage corresponding to a frequency for dividing a lighting enable time into 256 times, generates the clock signal of the frequency (reference clock signal), and outputs the generated clock signal to the timing signal generating section 114 and all the lighting time control/drive sections 118-1 to 118-58. The voltage control oscillator 148 is connected to the frequency divider 1/M 142 and the clock signal output from the voltage controlled oscillator 148 is divided and input to the frequency divider 1/M 142. The frequency divider 1/M 142 divides the frequency of the clock signal fed back from the voltage controlled oscillator 148 on the basis of the division ratio M determined by the light intensity adjusting data from the LUT 132.

The timing signal generating section 114 is connected to the control section 30 and the reference clock generating section 116 and generates transmission signals CK1R and CK1C and transmission signals CK2R and CK2C in synchronization with a horizontal synchronization signal (Lsync) from the control section 30 on the basis of the reference clock signal from the reference clock generating section 116. The transmission signals CK1R and CK1C and the transmission signals CK2R and CK2C are converted into a transmission signal CK1 and a transmission signal CK2 while passing through the level shift circuit 108 and output to the SLED 63. In FIG. 5, the timing signal generating section 114 outputs one set of transmission signals CK1R and CK1C and transmission signals CK2R and CK2C, but actually outputs plural sets of transmission signals CK1R and CK1C and transmission signals CK2R and CK2C (for example, 6 sets).

The timing signal generating section 114 is connected to the density blur correcting data section 112 and the image data expanding section 110 and outputs a data reading signal for reading out image data corresponding to the pixels from the image data expanding section 110 and a data reading signal for reading out the density blur correcting data corresponding to the pixels (LEDs) from the density blur correcting data section 112 in synchronization with signal Lsync from the control section 30 on the basis of the reference clock signal from the reference clock generating section 116. In addition, the timing signal generating section 114 is connected to the lighting time control/drive sections 118-1 to 118-58 and outputs trigger signals TRG for starting the lighting of the SLED 63 on the basis of the reference clock signal from the reference clock generating section 116.

The lighting time control/drive sections 118-1 to 118-58 correct the lighting times of the pixels (LEDs) on the basis of the density blur correcting data and generate lighting signals ΦI ((ΦI1 to ΦI58) for lighting the pixels of the SLED 63.

Figure 7:
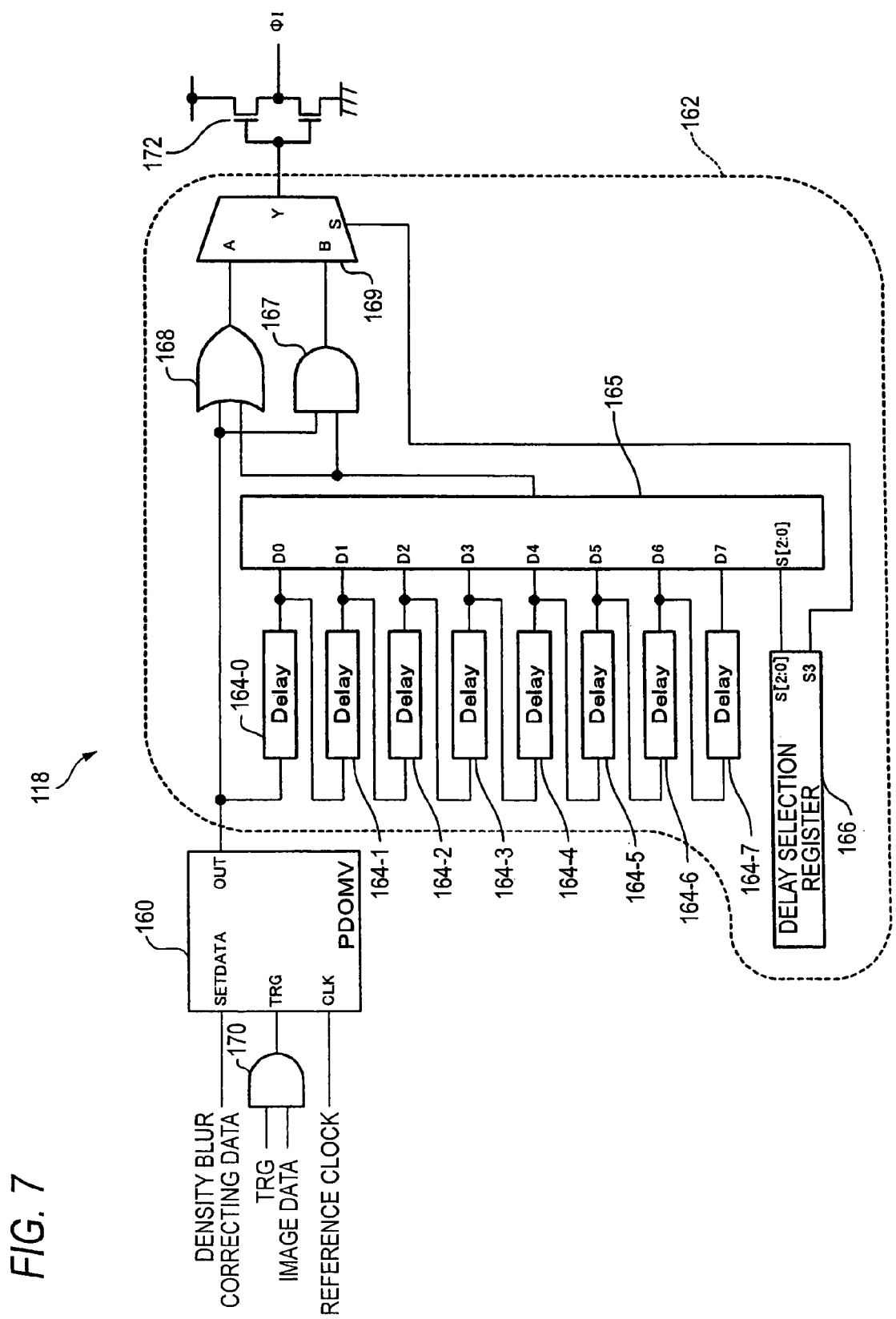
FIG. 7 is a block diagram illustrating the configuration of a lighting time control/drive section.

Specifically, as shown in FIG. 7 (which is a block diagram illustrating a configuration of the lighting time control/drive section 118), the lighting time control/drive sections 118-1 to 118-58 include a pre-settable digital one-shot multi vibrator (PDOMV) 160, a linearity correcting section 162, and an AND circuit 170. The AND circuit 170 is connected to the image data expanding section 110 and the timing signal generating section 114, outputs the trigger signal TRG from the timing signal generating section 114 to the PDOMV 160 when the image data from the image data expanding section 110 is 1 (ON), and does not output the trigger signal TRG when the image data is 0 (OFF). The PDOMV 160 is connected to the AND circuit 170, an OR circuit 168, the density blur correcting data section 112, and the reference clock generating section 116 and generates lighting pulses with the number of clocks corresponding to the density blur correcting data in synchronization with the trigger signal TRG from the AND circuit 170.

The linearity correcting section 162 corrects the lighting pulse signal from the PDOMV 160 and outputs the corrected lighting pulse signal so as to correct the deviation of the lighting start time in the LEDs of the SLED 63. Specifically, the linearity correcting section 162 includes a plurality of delay circuits 164 (8 delay circuits of 164-0 to 164-7 in this exemplary embodiment), a delay selection register 166, a delay signal selecting section 165, an AND circuit 167, an OR circuit 168, and a lighting signal selecting section 169. The delay circuits 164-0 to 164-7 are connected to the PDOMV 160 and are set to different times for delaying the lighting pulse signal from the PDOMV 160. The delay selection register 166 is connected to the delay signal selecting section 165 and the lighting signal selecting section 169 and delay selection data of the LEDs of the SLED 63 and lighting signal selecting data are stored in the delay selection register 166. The delay selecting data of the LEDs and the lighting signal selecting data are measured in advance and are stored in the EEPROM 109. The delay selecting data and the lighting signal selecting data stored in the EEPROM 109 are downloaded to the delay selection register 166 at the time of supplying power to the apparatus. A flash ROM may be used as the storage means. In this case, the flash ROM itself can function as the delay selection register 166.

The delay signal selecting section 165 is connected to the AND circuit 167 and the OR circuit 168 and selects one of the outputs of the delay circuits 164-0 to 164-7 on the basis of the delay selecting data stored in the delay selection register 166. The AND circuit 167 outputs a logical product of the lighting pulse signal from the PDOMV 160 and the delay lighting pulse signal selected by the delay signal selecting section 165, that is, outputs a lighting pulse when the lighting pulse signal before the delay and the lighting pulse signal after the delay are both in the lighting state. The OR circuit 168 outputs a logical sum of the lighting pulse signal from the PDOMV 160 and the delay lighting pulse signal selected by the delay signal selecting section 165, that is, outputs a lighting pulse when the lighting pulse signal before at least one of the delay and the lighting pulse signal after the delay is in the lighting state.

The lighting signal selecting section 169 selects one of the outputs of the AND circuit 167 and the OR circuit 168 on the basis of the lighting selection data stored in the delay selection register 166. The selected lighting pulse is output as a lighting signal ΦI to the SLED 63 through a MOSFET 172.

The signal generating circuit 100 having the above-mentioned configuration is connected to the SLED 63 through the level shift circuit 108 by a wiring formed on the LED circuit board 62. The signal generating circuit 100 outputs signals (driving signals) for driving the SLED 63, such as the lighting signals ΦI (ΦI1 to ΦI58), the transmission signals CK1R and CK1C, the transmission signals CK2R and CK2C, the transmission signal CK1, and the transmission signal CK2.

Figure 8:
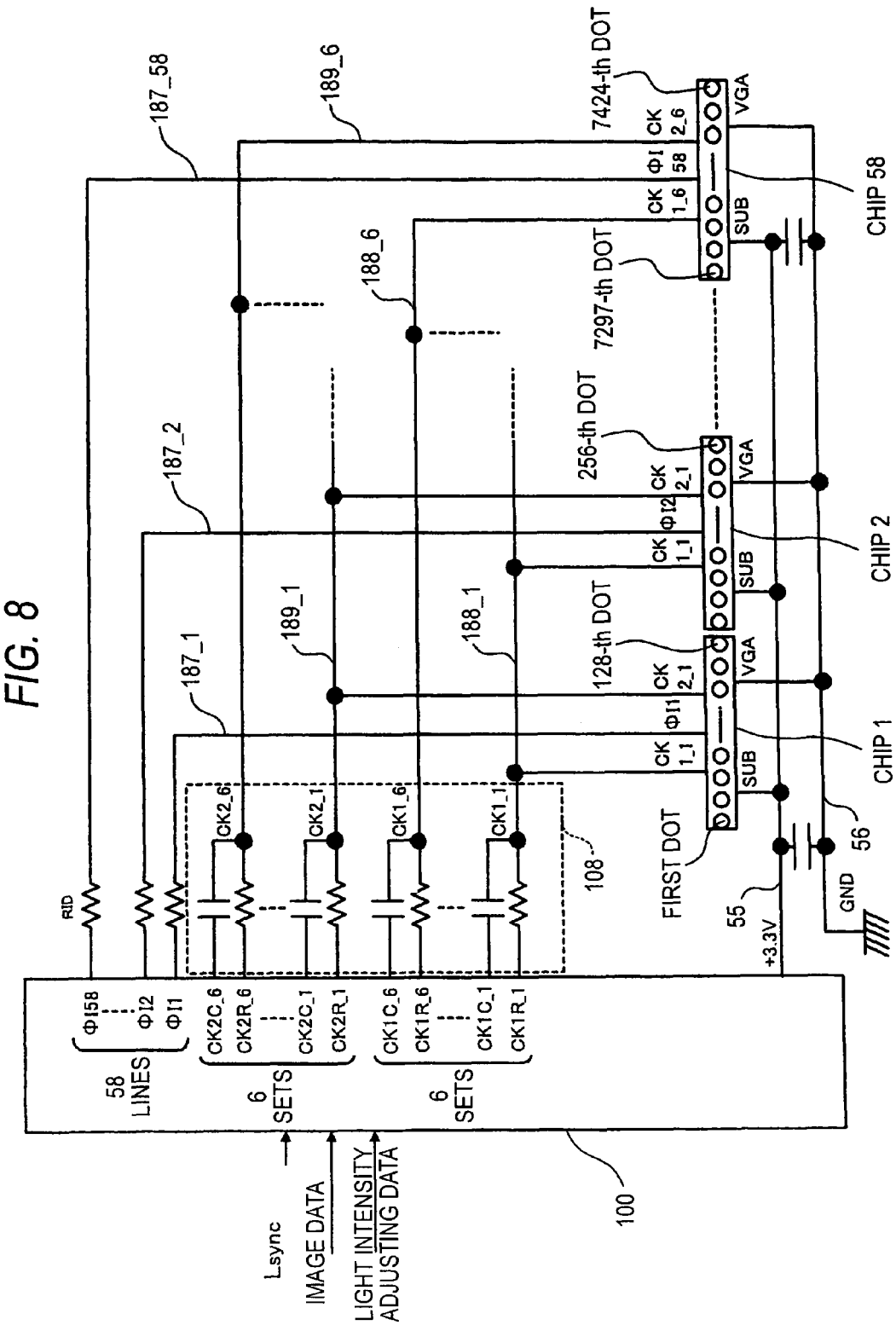
FIG. 8 is a diagram illustrating wirings between the signal generating circuit and the SLED which are formed on the LED circuit board.

FIG. 8 is a diagram illustrating wirings between the signal generating circuit 100 and the SLED 63 formed on the LED circuit board 62. As shown in FIG. 8, a +3.3V power supply line 55 for supplying power from the primary voltage regulator 106 to the SLED chips through the signal generating circuit 100, a grounded power supply line 56, signal lines 187 (187-1 to 187-58) for transmitting the lighting signals ΦI (ΦI1 to ΦI58) to the SLED chips from the signal generating circuit 100, signal lines 188 (188-1 to 188-6) for transmitting transmission signals CK1 (CK1-1 to CK1-6) to the SLED chips from the level shift circuit 108, and signal lines 189

(189-1 to 189-6) for transmitting transmission signals CK2 (CK2-1 to CK2-6) are wired on the LED circuit board 62. Here, with regard to the 6 sets of transmission signals CK1 (CK1-1 to CK1-6) and CK2 (CK2-1 to CK2-6), each set is connected to 9 or 10 SLED chips.

Figure 9:
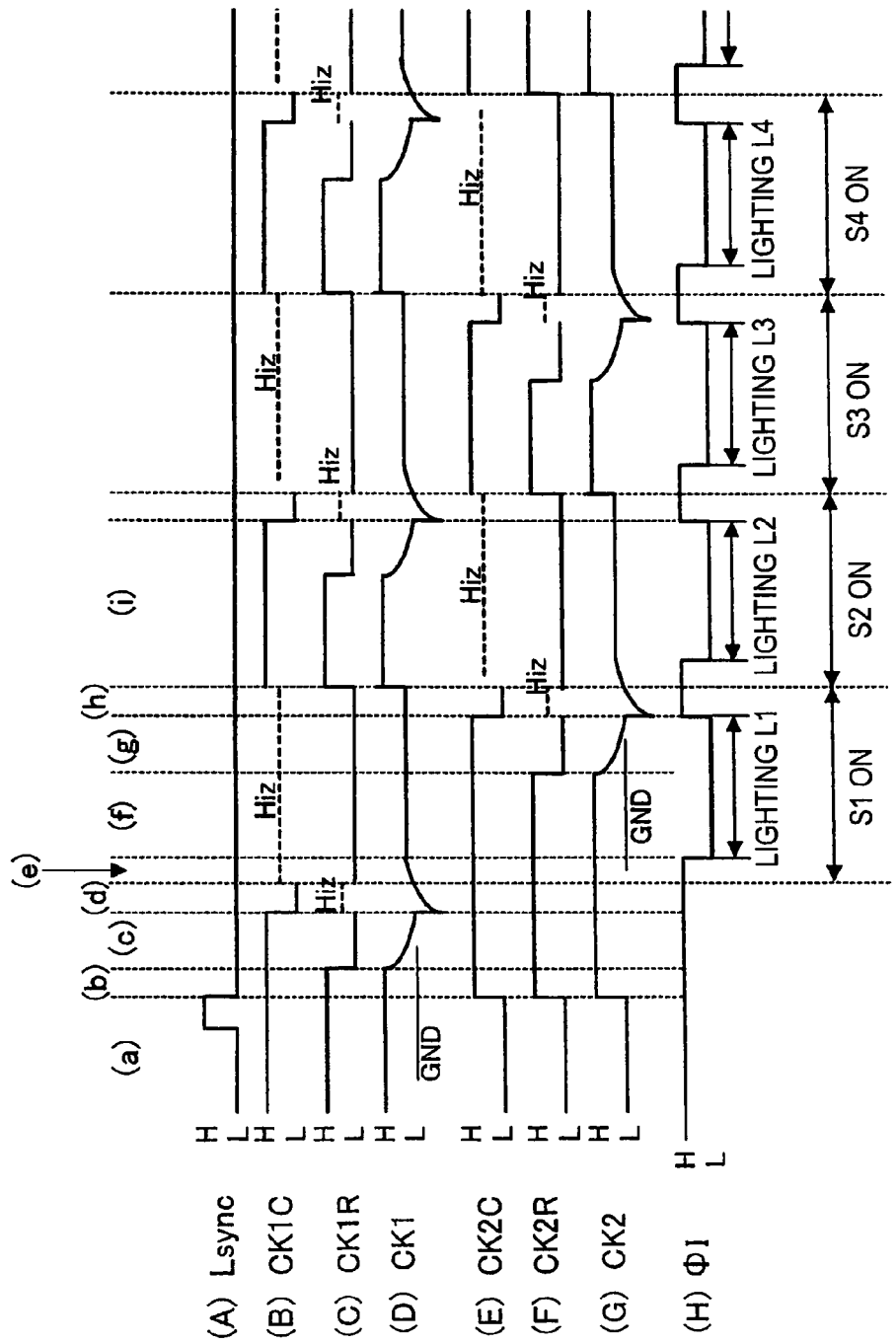
FIG. 9 is a time chart illustrating output timings of a driving signal output from the signal generating circuit and the level shift circuit.

FIG. 9 is a timing diagram illustrating output timings of driving signals output from the signal generating circuit 100 and the level shift circuit 108. The timing diagram shown in FIG. 9 illustrates that all the LEDs perform an optical writing operation (turns on).

(1) First, when a reset signal is input to the signal generating circuit 100 from the control section 30, the transmission signal CK1C is set to a high level (hereinafter, referred to as "H"), the transmission signal CK1R is set to "H", and the transmission signal CK1 is set to "H" in the timing signal generating section 114 of the signal generating circuit 100. The transmission signal CK2C is set to a low level (hereinafter, referred to as "L"), the transmission signal CK2R is set to "L", and the transmission signal CK2 is set to "L." Accordingly, all the thyristors S1 to S128 of the SLED 63 are set to an OFF state ((a) in FIG. 9).

(2) Subsequently to the reset signal, the horizontal synchronization signal Lsync output from the control section 30 is changed to "H" (FIG. 9(A)) and thus the operation of the SLED 63 is started. As shown in FIGS. 9(E), 9(F), and 9(G), the transmission signal CK2C and the transmission signal CK2R are changed to "H" and the transmission signal CK2 is changed to "H" in synchronization with the horizontal synchronization signal Lsync ((b) in FIG. 9).

(3) Next, as shown in FIG. 9(C), the transmission signal CK1R is changed to "L" ((c) in FIG. 9).

(4) Subsequently, as shown in FIG. 9(B), the transmission signal CK1C is changed to "L" ((d) in FIG. 9).

In this state, the gate current of the thyristor S1 starts to flow. At this time, the reverse flowing of the current is prevented by setting a tristate buffer B1R of the signal generating circuit 100 to a high impedance (Hiz).

Thereafter, the thyristor S1 is turned on by the gate current of the thyristor S1 and the gate current increases gradually. At this time, the current flows in the capacitor C1 of the level shift circuit 108 and thus the potential of the transmission signal CK1 increases gradually.

(5) After a predetermined time (at a time when the potential of the transmission signal CK1 is close to GND) elapses, the tristate buffer B1R of the signal generating circuit 100 is set to "L" ((e) in FIG. 9). Then, the potential of the gate G1 increases, thereby increasing the potential of the signal line $\Phi I$ and the potential of the transmission signal CK1. Accordingly, current starts to flow in the resistor R1B of the level shift circuit 108. On the other hand, the current flowing in the capacitor C1 of the level shift circuit 108 decreases gradually in accordance with the increase in potential of the transmission signal Ck1.

When the thyristor S1 is completely turned on and is in a steady state, the current for maintaining the ON state of the thyristor S1 flows in the resistor R1B of the level shift circuit 108 but does not flow in the capacitor C1.

At this time, as shown in FIG. 9(B), the tristate buffer B1C of the signal generating circuit 100 is set to high impedance (Hiz) ((e) in FIG. 9).

(6) In the state where the thyristor S1 is completely turned on, as shown in FIG. 9(H), the lighting signal $\Phi I$ is changed to "L" (FIG. 9(f)). At this time, since the potential of the gate G1>the potential of the gate G2, the LED L1 of the thyristor structure is earlier turned on and lighted. Since the potential of the signal line $\Phi I$ increases with the turning-on of the LED L1, the LED L2 and the LEDs subsequent to the LED L2 are not turned on. That is, only the LED L1 having the highest gate voltage is turned on (lighted) among the LEDs L1, L2, L3, L4.

(7) Next, as shown in FIG. 9(F), when the transmission signal CK2R is set to "L" ((g) in FIG. 9), current flows similarly to (c) in FIG. 9, a voltage is generated across the capacitor C2 of the level shift circuit 108.

(8) As shown in FIG. 9(E), when the transmission signal CK2C is changed to "L" in this state ((h) in FIG. 9), the thyristor S2 is turned on.

(9) Then, as shown in FIGS. 9(B) and 9(C), when the transmission signals CK1C and CK1R are simultaneously changed to "H" ((i) in FIG. 9), the thyristor S1 is turned off and is discharged through the resistor R1, thereby decreasing the potential of the gate G1 gradually. At this time, the thyristor S2 is completely in the ON state. By switching the lighting signal $\Phi I$ between "L" and "H" in synchronization with the turning-on of the thyristor S2, it is possible to light or extinguish the LED L2. In this case, since the potential of the gate G1 is lower than the potential of the gate G2, the LED L1 is not turned on.

(10) By sequentially performing the above-mentioned operation, the LEDs L1 to L128 are sequentially lighted.

In this way, in the signal generating circuit 100 according to this exemplary embodiment, the timing signal generating section 114 changes the transmission signals CK1C and CK1R from "H" to "L" and changes the transmission signals CK2C and CK2R from "L" to "H." As a result, by repeatedly changing the potential of the transmission signal CK1 from the level shift circuit 108 from "H" to "L" and from "L" to "H", the odd thyristors S1, S3, . . . , S127 are sequentially operated in the order of OFF→ON→OFF. In addition, by repeatedly changing the potential of the transmission signal CK2 from the level shift circuit 108 from "H" to "L" and from "L" to "H", the even thyristors S2, S4, . . . , S128 are sequentially operated in the order of OFF→ON→OFF. As a result, by operating the thyristors S1 to S128 in the order of OFF→ON→OFF corresponding to the order of S1→S2→, . . . , →S127→S128 and outputting the lighting signals $\Phi I1$ to $\Phi I58$ from the lighting time control/drive section 118-1 to 118-58 in synchronization therewith, the LEDs L1 to L128 are sequentially lighted.

In the LPH 14 according to this exemplary embodiment, since the SLED 63 is driven with three driving signals of the lighting signal $\Phi I$, the transmission signal CK1, and the transmission signal CK2, the wirings are simplified as shown in FIG. 8.

Next, the primary voltage regulator 106 and the secondary voltage regulator 107 disposed on the LED circuit board 62 will be described.

As shown in FIGS. 3 and 5, the SLED 63 is connected to the primary voltage regulator 106 through the signal generating circuit 100 and is supplied with a stable driving voltage of VDD=+3.3 V from the primary voltage regulator 106. The signal generating circuit 100 is connected to the secondary voltage regulator 107 and the signal generating circuit 100 is supplied with a stable voltage of 1.8 V from the secondary voltage regulator 107.

In this way, in the LPH 14 according to this exemplary embodiment, the LED circuit board 62 on which the SLED 63 and the signal generating circuit 100 are disposed are mounted with the primary voltage regulator 106 and the secondary voltage regulator 107. Accordingly, the influence of impedance of the power harness 101 for transmitting power from the main power source 70 of the image forming apparatus can be reduced, thereby supplying a stable voltage to the SLED 63 and the signal generating circuit 100.

In the image forming apparatus forming a color image according to this exemplary embodiment, as shown in FIG. 1, a tandem configuration in which the image forming units 11Y, 11M, 11C, and 11K forming the toner images of yellow (Y), magenta (M), cyan (C), and black (K) are arranged in parallel are often employed. In this configuration, the power harnesses 101 for connecting the main power source 70 to the LPHs 14 of the image forming units 11 are wired in different paths.

Figure 10:
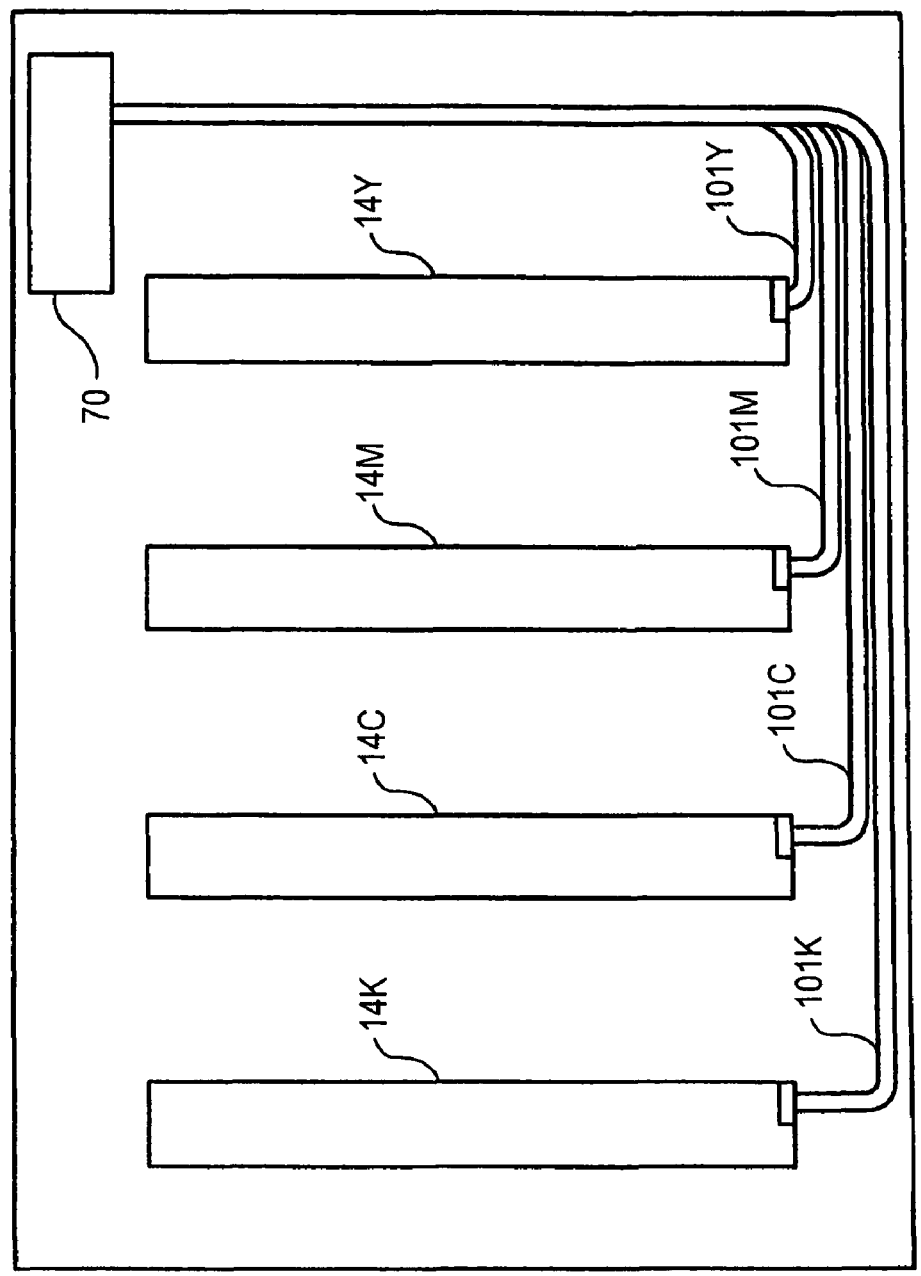
FIG. 10 is a plan view illustrating an example of a wiring path of a power harness for connecting a main power source to the LPH disposed in each image forming unit.

FIG. 10 is a plan view illustrating wiring paths of the power harnesses 101 for connecting the main power source 70 to the LPHs 14Y, 14M, 14C, and 14K disposed in the image forming units 11Y, 11M, 11C, and 11K, respectively. As shown in FIG. 10, with the requirement for decrease in size of the apparatus or decrease in manufacturing cost therefor, the main power source 70 is generally configured as a collected unit. In this case, the power harnesses 101 for connecting the main power source 70 to the LPHs 14Y, 14M, 14C, and 14K are wired in different paths. As a result, a power harness 101 having a longer path appears and thus the power harness 101 having large impedance is inevitably disposed.

Here, FIG. 11 is a diagram illustrating a variation in light intensity occurring in the SLED 63 due to the influence of impedance of the power harness 101. In FIG. 11, an image in which a solid image area having a low-density image area (for example, white solid image), a high-density image area (for example, black solid image), and a low-density image area (for example, white solid image) sequentially formed in a process direction (sub-scanning direction) and an image area having a constantly set lighting ratio of the LEDs in the SLED 63 on the downstream side in the main scanning direction are formed is shown. The "lighting ratio" means a ratio (=the number of lighted LEDs/the number of LEDs disposed in an SLED chip) of the number of lighted LEDs to the number of LEDs arranged in each SLED chip. That "the lighting ratio of the SLED 63 is constant" means that a constant number of LEDs (for example, 64 LEDs) of, for example, 128 LEDs disposed in each SLED chip are lighted. For example, when 64 LEDs of 128 LEDs are lighted, the lighting ratio is 50%.

As shown in FIG. 11, in the image area having a constant lighting ratio which is formed on the downstream side of the low-density image area, since the voltage supplied to the SLED 63 is sufficiently high, a desired image density can be substantially obtained. On the other hand, in the image area having a constant lighting ratio which is formed on the downstream side of the high-density image area, since the voltage supplied to the SLED 63 is decreased, a desired image density is not obtained and thus an image having an image density lower than a desired image density is formed.

Figure 12A:
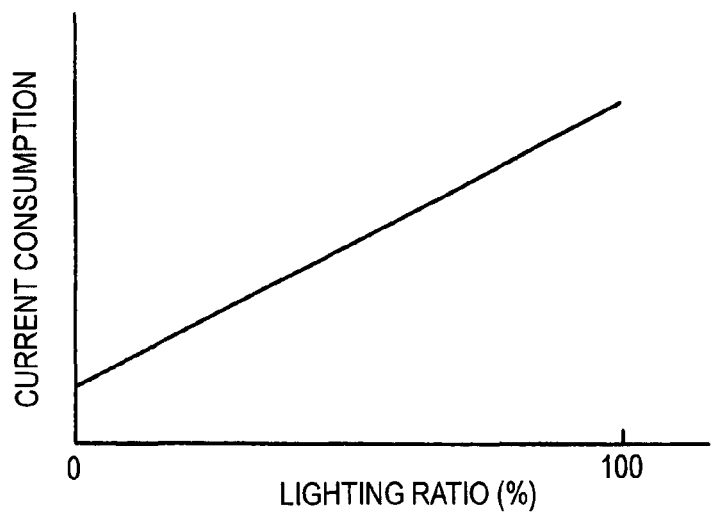
FIG. 12A is a diagram illustrating a relation between a lighting ratio of the SLED and a current value consumed in the SLED and FIG. 12B is a diagram illustrating a relation between the lighting ratio of the SLED and a voltage supplied to the SLED.
Figure 12B:
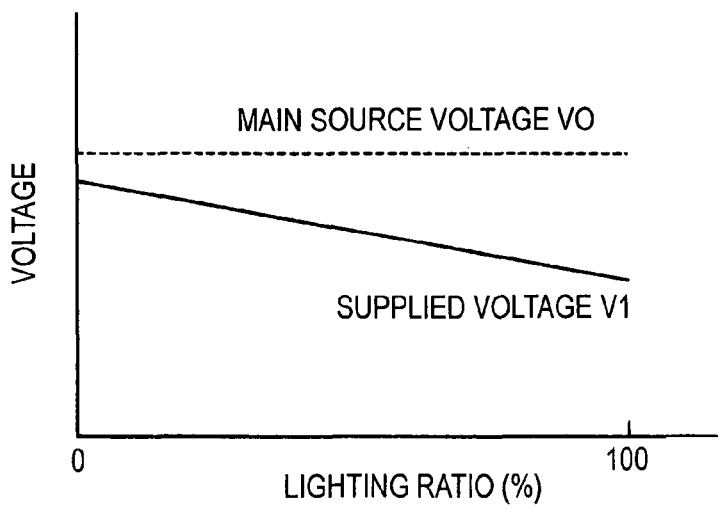

FIG. 12A is a diagram illustrating a relation between a lighting ratio of the SLED 63 and a current value consumed in the SLED 63 and FIG. 12B is a diagram illustrating a relation between the lighting ratio of the SLED 63 and a voltage supplied to the SLED 63. As shown in FIG. 12A, when the lighting ratio in the SLED 63 increases, the current consumption of the SLED 63 increases proportionally. On the other hand, as shown in FIG. 12B, when the lighting ratio of the SLED 63 increases and the current consumption of the SLED 63 increases, the voltage (V1) supplied to the SLED 63 decreases proportionally although the voltage (V0) of the main power source 70 is constant. This is because the voltage drop due to the impedance of the power harness 101 increases as the amount of current increases, thereby decreasing the voltage (V1) supplied to the SLED 63. When the voltage (V1) supplied to the SLED 63 decreases, the light intensity emitted from the SLED chips decreases.

Accordingly, in the state where the lighting ratio of the SLED 63 in a line of an image is high like the high-density image area of FIG. 11, the amount of current consumed in the SLED 63 increases and the voltage (V1) supplied to the SLED 63 decreases. Therefore, the light intensity emitted from the SLEDs decreases in the image area having a constant lighting ratio which is formed on the downstream side of the high-density image area. As a result, the potential of the latent image formed on the photosensitive drum 12 does not decrease to a desired value and thus a desired developing contrast is not obtained. Accordingly, the image density is lower than the desired image density.

On the other hand, in the state where the lighting ration of the SLED 63 in a line of the image is low like the low-density image area of FIG. 11, the amount of current consumed in the SLED 63 is small and the voltage (V1) supplied to the SLED 63 little decreases. Accordingly, the light intensity emitted from the SLED chips little decreases in the image area having a constant lighting ratio which is formed on the downstream side of the low-density image area. As a result, the potential of the latent image formed on the photosensitive drum 12 can decrease to a desired value, thereby obtaining a desired developing contrast. Therefore, the image density becomes the desired image density.

In this way, in the image area having a constant lighting ratio of FIG. 11, an area having a constant image density should be formed in the sub-scanning direction. However, due to the influence of the impedance of the power harness 101, an area having a relatively low density is formed on the downstream side of the high-density image area and an area having a relatively high density is formed on the downstream side of the low-density image area. Accordingly, there is a problem in image quality that the uniformity in image density decreases.

Such a phenomenon is inevitable, because a power harness 101 having a long path appears in the known image forming apparatus mounted with a plurality of LPHs 14Y, 14M, 14C, and 14K shown in FIG. 10. That is, since distances from the power harnesses 101Y, 101M, 101C, and 101K to the main power source 70 are different from each other, one power harness 101 having a relatively long path exists necessarily and has an influence of impedance on itself. In the configuration shown in FIG. 10, the LPH 14K most distant from the main power source 70 or the LPH 14C next thereto can easily cause a problem in image quality due to the influence of impedance of the power harnesses 101K and 101C.

On the contrary, in the LPH 14 according to this exemplary embodiment, the primary voltage regulator 106 and the secondary voltage regulator 107 are mounted on the LED circuit board 62 on which the SLED 63 and the signal generating circuit 100 are disposed. Accordingly, even when the amount of current consumed by the SLED 63 increases and the voltage drop due to the impedance of the power harness 101 increases, the voltage drop due to the power harness 101 can be compensated for thanks to the primary voltage regulator 106 disposed on the LED circuit board 62 on the downstream side of the power harness 101. Therefore, the primary voltage regulator 106 can keep the voltage value constant, thereby suppressing the voltage (V1) supplied to the SLED 63 from decreasing. As a result, the light intensity emitted from the SLED 63 is stabilized regardless of the lighting ratio in the SLED 63 and thus an image having the image density corresponding to the image data in the image density areas is formed.

When a plurality of LPHs 14 are disposed as shown in FIG. 10, the apparatus can be designed without a restriction in design that the paths of the power harnesses 101 should be shortened to reduce the influence of impedance of the power harnesses 101. For example, it is not necessary to provide capacitors and the like as power sources or voltage sources in the vicinity of four LPHs 14. It is possible to freely set the arrangement paths of the power harnesses 101. Similarly, the secondary voltage regulator 107 can keep the voltage supplied to the signal generating circuit 100 substantially constant regardless of impedance values of the power harnesses 101. Accordingly, it is possible to secure a stable operation of the signal generating circuit 100.

Figure 15:
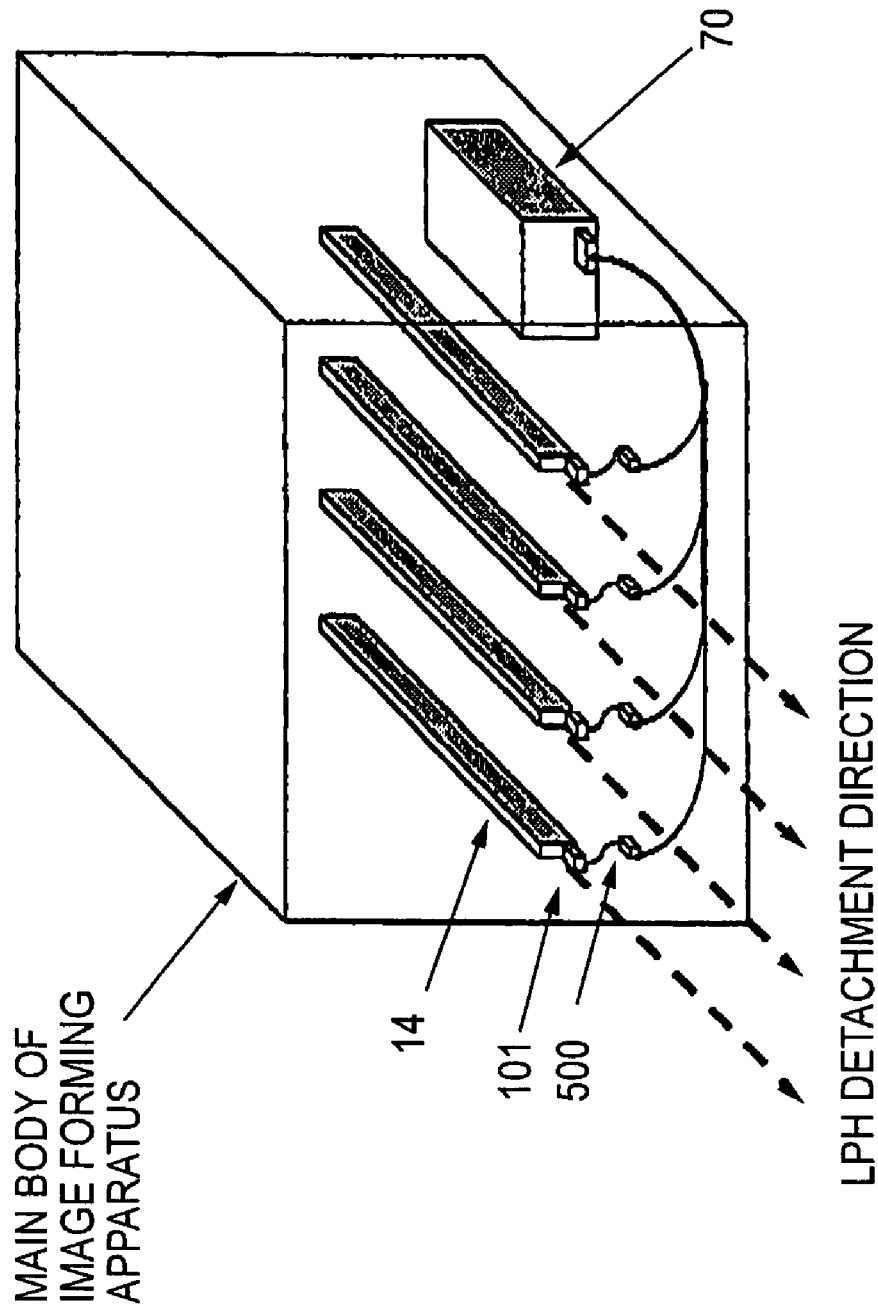
FIG. 15 is a perspective view illustrating the example of the wiring path of the power harness for connecting the main power source to the LPH disposed in each image forming unit.

The LPH 14 according to this exemplary embodiment is detachably attached to a main body of the image forming apparatus so as to facilitate the interchange for maintenance. At this time, the power supply connector 103 for connecting the power harness 101 and the signal connector 104 for connecting the signal harness 102 may be disposed on the front side in the detachment direction of the LPH 14 so as to facilitate the detachment of the power harness 101 and the signal harness 102 from the LPH 14. FIG. 15 is a perspective view illustrating the example of the wiring path of the power harness for connecting the main power source 70 to the LPH 14 disposed in the main body of the image forming apparatus. Relay connectors 500 may be provided on the front side of the LPH 14 in the detachment direction of the LPH 14. For example, to attach the LPH 14, after the LPH 14 is attached to the image forming apparatus, the relay connector 500 is connected to the LPH 14. Also, to detach the LPH 14, at first the relay connector 500 is detached from the LPH 14 and then, the LPH 14 is detached from the image forming apparatus.

In this exemplary embodiment, it has been described that the image forming units 11Y, 11M, 11C, and 11K are disposed in parallel in the image forming apparatus and are provided with the LPHs 14Y, 14M, 14C, and 14K, respectively. However, the invention is not limited to such a configuration. The invention can be applied to a configuration including only one LPH, such as a monochrome image forming apparatus including only an image forming unit for forming a black image and a color image forming apparatus which is mounted with four developing devices storing color toners of yellow (Y), magenta (M), cyan (C), and black (K) and which repeatedly forms four color toner images on a photosensitive drum by using a so-called rotary developing. That is, in the image forming apparatus including only one LPH, since the voltage supplied to the SLED can be kept substantially constant regardless of the impedance value of the power harness, it is possible to stabilize the light intensity emitted from the SLED regardless of the lighting ratio of the SLED. There is not restriction in design to the path length of the power harness.

Figure 13:
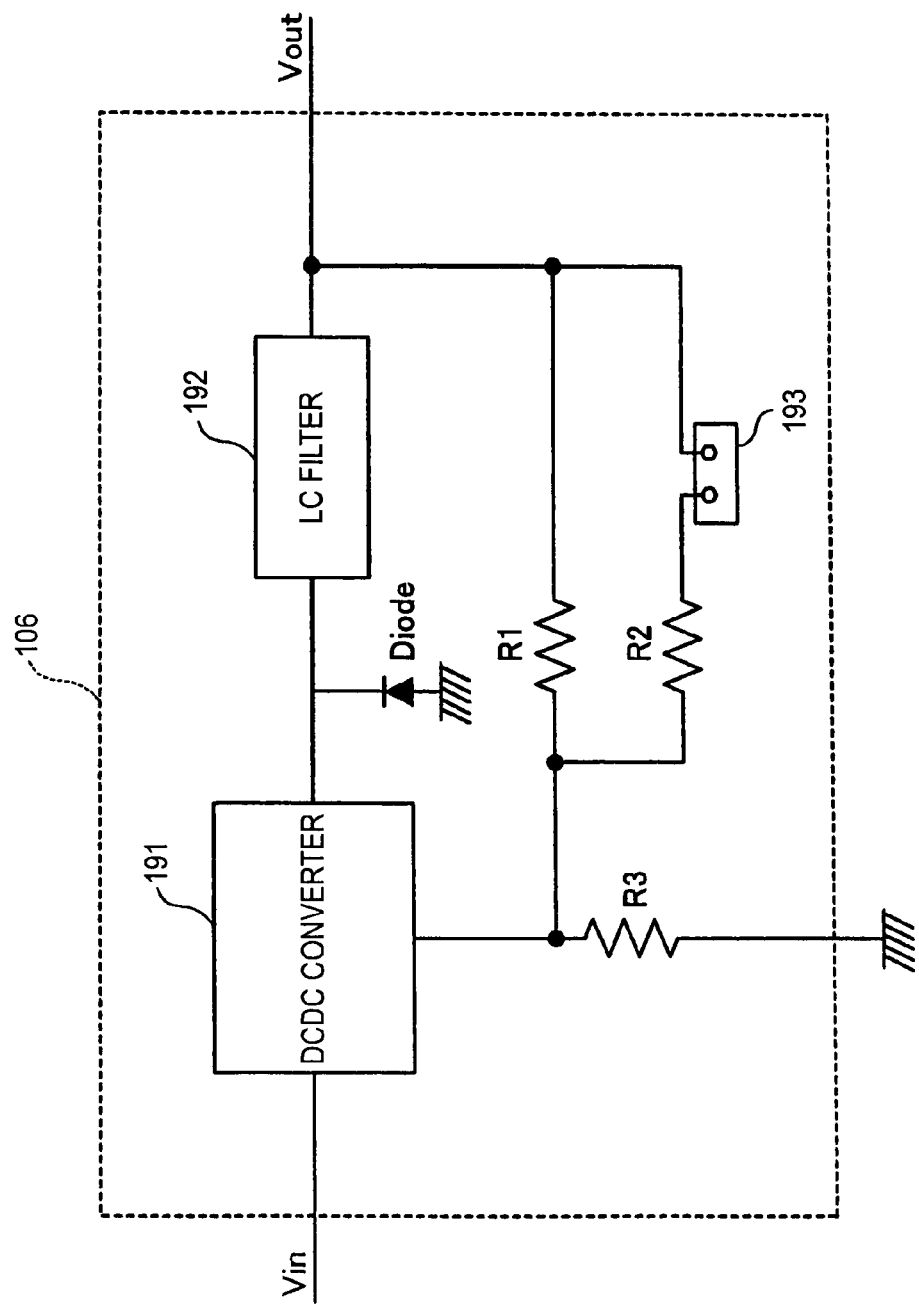
FIG. 13 is a circuit diagram illustrating the configuration of a primary voltage regulator.

Next, the configuration of the primary voltage regulator 106 according to this exemplary embodiment will be described. FIG. 13 is a circuit diagram illustrating the configuration of the first voltage regulator. As shown in FIG. 13, the primary voltage regulator 106 includes a DCDC converter 191, an LC filter 192, a diode, voltage-dividing resistors R1, R2, and R3, and a jumper switch 193. The primary voltage regulator 106 converts an input voltage Vin into a predetermined output voltage Vout and outputs the converted voltage.

The primary voltage regulator 106 according to this exemplary embodiment is configured to freely set the voltage-dividing resistor R2 for a negative feedback voltage to a short-circuited or opened state by the use of the jumper switch 193 as an example of the output voltage varying means. Accordingly, it is possible to change the voltage value of the output voltage Vout.

Specifically, at the time of shipping the image forming apparatus, a state where current flows in the voltage-dividing resistor R2 is set by short-circuiting the jumper switch 193. Accordingly, the output voltage Vout is set to, for example, VDD=+3.3 V and is supplied to the SLED 63. Thereafter, when the accumulated time of using the image forming apparatus is elongated and a transmission failure occurs in the SLED 63, the flow of current to the voltage-dividing resistor R2 is blocked by opening the jumper switch 193. Accordingly, the divided voltage of the voltage-dividing resistor R1 is reduced and the output voltage Vout is set to be higher than, for example, 3.3 V and is supplied to the SLED 63.

As shown in FIG. 9, the signal generating circuit 100 according to this exemplary embodiment sequentially operates the thyristors S1 to S128 in the order of OFF→ON→OFF by repeatedly changing the potentials of the transmission signal CK1 and the transmission signal CK2 from "H" to "L" and from "L" to "H" by the use of the level shift circuit 108 and outputs the lighting signals ΦI1 to ΦI58 in synchronization therewith to sequentially light the LEDs L1 to L128.

In order to normally turn on and off the thyristors S1 to S128, the driving voltage VDD supplied to the SLED 63 needs to be equal to or higher than a predetermined value. When the driving voltage VDD is lower than the predetermined value, the adjacent thyristor is not turned on right after the transmission is started or in the course of the transmission, but the thyristor turned on may be turned on again on the contrary. That is, the "transmission failure" may occur that the thyristors S1 to S128 are not sequentially operated in the order of OFF→ON→OFF and the lighting enable state of the LEDs is not transmitted in the main scanning direction.

When the transmission failure occurs and the lighting signals ΦI1 to ΦI58 are turned on at any time, the same LEDs are turned on. Accordingly, it is not possible to form a normal image. For example, when an image having a uniform intermediate density is formed, there is a problem in that only the LEDs L1 disposed most upstream in the main scanning direction of the SLED chips are lighted and only vertical line images with a pitch of an SLED chip width.

The transmission failure tends to more often occur when the SLED chip is deteriorated with the lapse of years. This is because the lower limit of the driving voltage VDD of the SLED 63 for normally turning on and off the thyristors S1 to S128 is lowered with the deterioration of the SLED chip. Accordingly, when the SLED chip is deteriorated with the lapse of years and the vertical line images with the pitch of the SLED chip width occurs due to the transmission failure, it is effective to enhance the driving voltage VDD up to a voltage for more stably turning on and off the thyristors S1 to S128 than the normal driving voltage VDD=+3.3 V supplied to the SLED 63.

Therefore, the primary voltage regulator 106 according to this exemplary embodiment is configured so as to freely short-circuit and open the voltage-dividing resistor R2 by the use of the jumper switch 193. When the transmission failure occurs in the SLED 63, it is possible to set the output voltage Vout to a value higher than 3.3 V by opening the jumper switch 193 to block the flow of current in the voltage-divided resistor R2 and thus decreasing the divided voltage in the voltage-dividing resistor R1.

At this time, since the first regulator 106 according to this exemplary embodiment is disposed on the LED circuit board 62 of the LPH 14, it is possible to individually cope with the deterioration of the LPHs 14 with the lapse of years. Accordingly, it is not necessary to uniformly set the driving voltage VDD to be higher in spite of existence of an LPH 14 which is not deteriorated with the lapse of years and thus it is possible to supply the driving voltage VDD corresponding to the degree of deterioration with the lapse of years.

In this exemplary embodiment, the jumper switch 193 has been used as the output voltage changing means, but a switch member such as a DIP switch or a switching method using software may be used as long as it is switching means for freely short-circuiting and opening the voltage-dividing resistor R1.

A common-mode choke coil 105 for reducing a current noise is disposed on the LED circuit board 62 according to this exemplary embodiment. A noise having the same phase may be easily mixed into the current supplied to the power supply connector 103 through the power harness 101 from the main power source 70 in the course of passing through the primary voltage regulator 106, the secondary voltage regulator 107, the signal generating circuit 100, and the SLED 63. When the noise is reflected to the power harness 101, a large radiation noise may be generated by the power harness 101.

Therefore, in the LPH 14 according to this exemplary embodiment, the common-mode choke coil 105 for reducing the current noise is disposed on the LED circuit board 62 before the noise is mixed into the power harness 101. Accordingly, the noises overlapped in the units on the LED circuit board 62 are reduced by the common-mode choke coil 105.

A heat radiating mechanism for radiating heat generated from the primary voltage regulator 106 and the secondary voltage regulator 107 is provided in the LED circuit board 62 according to this exemplary embodiment.

Figure 14A:
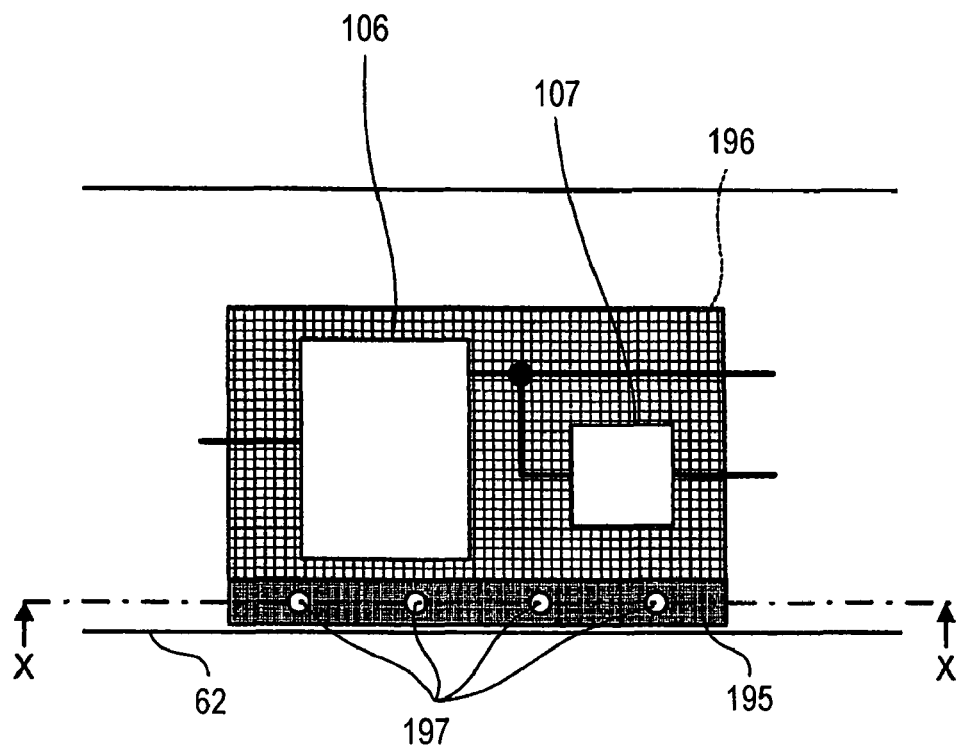
FIG. 14A is a plan view illustrating an LED circuit board in an area where the primary voltage regulator and a secondary voltage regulator are disposed and FIG. 14B is a section view taken along a line XX in FIG. 14A.
Figure 14B:
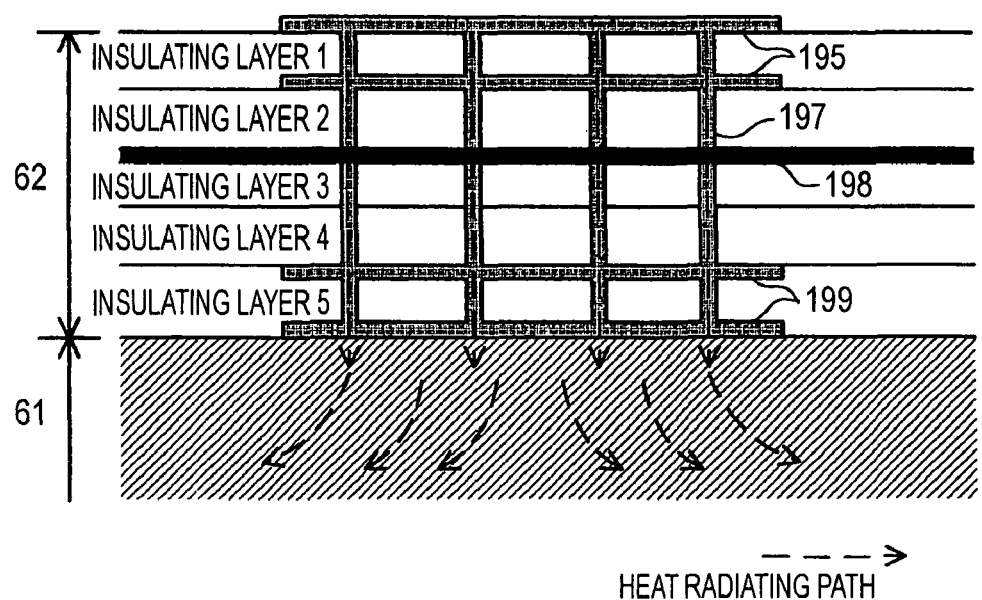

FIG. 14A is a plan view of the LED circuit board 62 illustrating an area where the first voltage regulator 196 and the secondary voltage regulator 107 are disposed and FIG. 14B is a sectional view taken along line XX of FIG. 14B. As shown in FIG. 14B, the LED circuit board 62 has a multi-layered (6-layered) structure. Where a ground (GND) pattern 198, two insulting layers 1 and 2 disposed on the ground pattern 198, and three insulating layers 3, 4, and 5 disposed under the ground pattern 198 are stacked. The lowermost insulating layer 5 is closely supported by the housing 61 made of metal such as aluminum and SUS having excellent heat conductivity.

In the LED circuit board 62 according to this exemplary embodiment, a heat radiating pattern 196 as an example of heat radiating unit is disposed on the surface of the insulating layer 1, between the insulating layer 1 and the insulating layer 2, between the insulating layer 4 and the insulating layer 5, and on the surface of the insulating layer 5 facing the housing 61 in the areas in which the primary voltage regulator 106 and the secondary voltage regulator 107 are disposed, as the heat radiating mechanism. Heat radiating pads 195 are disposed at the ends of the heat radiating patterns 196 facing the same side and the heat radiating pads 195 and the housing 61 are thermally connected to each other via through holes 197 as an example of the heat conducting member. Accordingly, the heat generated from the primary voltage regulator 106 and the secondary voltage regulator 107 is radiated to the heat radiating patterns 196 and is transmitted to the housing 61 through the heat radiating pads 195 and the through holes 197 from the heat radiating patterns 196. As a result, the heat is diffused to the housing 61 having excellent heat conductivity and large heat capacity.

In this case, when the heat radiating pads 195 are grounded (GND) so as to stabilize the ground potential and to reduce the amount of electromagnetic noises, the heat radiating pads 195 may be connected to the ground pattern 198 through the through holes 197.

In the LPH 14 according to this exemplary embodiment, as described above, the primary voltage regulator 106 and the secondary voltage regulator 107 are disposed on the LED circuit board 62. Accordingly, when the heat generated from the primary voltage regulator 106 and the secondary voltage regulator 107 is accumulated in the area where the primary voltage regulator 106 and the secondary voltage regulator 107 are disposed, the LED circuit board 62 maybe thermally deformed and the light irradiating position of the SLED 63 may vary, thereby deteriorating the image quality.

Therefore, in the LED circuit board 62 according to this exemplary embodiment, by forming a path through which the heat generated from the primary voltage regulator 106 and the secondary voltage regulator 107 is transmitted in the order of the heat radiating pattern 196→the heat radiating pads 195→the through hole 197→the housing 61 and using the housing 61 as a heat sink, the temperature of the LPH 14 is suppressed.

In the LPH 14 according to this exemplary embodiment, the primary voltage regulator 106 and the secondary voltage regulator 107 employ a multi-staged structure in which the voltage converted by the primary voltage regulator 106 is converted again by the secondary voltage regulator 107. Accordingly, since the voltage difference between the input voltage and the output voltage of the secondary voltage regulator 107 can be set small and thus the energy loss decreases, the energy loss is smaller than that of the case where the voltage is directly received from the main power source and is converted. Therefore, it is possible to reduce the amount of heat emitted from the secondary voltage regulator 107.

In this way, in the LPH 14 according to this exemplary embodiment, the entire amount of heat emitted from the LPH 14 can be suppressed by disposing the primary voltage regulator 106 and the secondary voltage regulator 107 in multi stages.

As described above, in the LPH 14 according to this exemplary embodiment, the primary voltage regulator 106 and the secondary voltage regulator 107 are mounted on the LED circuit board 62 in which the SLED 63 and the signal generating circuit 100 are disposed. Accordingly, since the influence of impedance of the power harness 101 for transmitting power from the main power source 70 of the image forming apparatus can be reduced and a stable voltage can be supplied to the SLEDs 63 and the signal generating circuits 100, it is possible to stabilize the light intensity emitted from the SLEDs 63.

The degree of freedom in design of an apparatus can be remarkably enhanced without a restriction in design that the paths of the power harnesses 101 should be shortened to reduce the influence of impedance of the power harnesses 101. Accordingly, it is possible to easily decrease the size of the apparatus and to enhance the degree of freedom in layout of the functional units of the apparatus.

What is claimed is:
1. An exposure device comprising:
a circuit board;
a light-emitting element member disposed on the circuit board, the light-emitting element comprising:
   a plurality of light-emitting elements arranged in a line; and
   a plurality of switching elements disposed so as to correspond to the plurality of light-emitting elements, wherein when the plurality of switching elements sequentially set the respective light-emitting elements to be in a state where the respective light-emitting elements can turn on, the respective light-emitting elements turn on sequentially;
a driving signal generating unit disposed on the circuit board, the driving signal generating unit that generates driving signals for driving the respective light-emitting elements arranged in the light-emitting element member;

a first voltage supply unit disposed on the circuit board, the voltage supply unit that supplies a first predetermined voltage to the light-emitting element member; and a second voltage supply unit disposed on the circuit board, the second voltage supply unit that converts the first predetermined voltage supplied from the first voltage supply unit into a second predetermined voltage and supplies the second predetermined voltage to the driving signal generating unit.

2. The device according to claim 1, further comprising:
a noise reducing unit disposed on the circuit board and on an input side of the first voltage supply unit, the noise reducing unit that reduces a noise included in a current.

3. The device according to claim 1, wherein the first voltage supply unit is configured so that the first predetermined voltage is changeable.

4. The device according to claim 1, further comprising:
a heat radiating unit that radiates heat generated from the first voltage supply unit.

5. The device according to claim 4, further comprising:
a support member that supports the circuit board; and
a heat conducting member that connects the heat radiating unit to the support member.

6. An exposure system comprising:
a plurality of exposure devices according to claim 1; and
a common power source that supply voltage to each of the exposure devices, wherein:
the first voltage supply unit of each exposure device adjusts the voltage supplied from the common power source to supply the first predetermined voltage to the light-emitting element member of each exposure device, and
the first predetermined voltages supplied by the first voltage supply units of the respective exposure devices are substantially equal to each other.

7. The system according to claim 6, wherein each exposure device further comprises a noise reducing unit disposed on the circuit board and on an input side of the first voltage supply unit, the noise reducing unit that reduces a noise included in a current.

8. The system according to claim 6, wherein the first voltage supply unit of each exposure device is configured so that the first predetermined voltage is changeable.

9. The system according to claim 6, each exposure device further comprises a heat radiating unit that radiates heat generated from the first voltage supply unit.

10. The system according to claim 9, each exposure device further comprises:
a support member that supports the circuit board; and
a heat conducting member that connects the heat radiating unit to the support member.

11. An image forming apparatus comprising:
a plurality of image carriers;
a plurality of exposure devices according to claim 1 provided correspondingly to the respective image carriers, the exposure devices that expose the respective image carriers; and
a common power source that supplies voltage to each of the exposure devices, wherein:
the first voltage supply unit of each exposure device adjusts the voltage supplied from the common power source to supply the first predetermined voltage to the light-emitting element member of each exposure device, and
the first predetermined voltages supplied by the first voltage supply units of the respective exposure devices are substantially equal to each other.

12. The apparatus according to claim 11, further comprising:
a main body, wherein:
each exposure device is detachably attached to the main body, and
each first voltage supply unit is connected to a wiring for transmitting voltage from the power source, from a front side in a detachment direction.

13. The apparatus according to claim 11, wherein each exposure device further comprises an output voltage changing unit that increases the first predetermined voltage output from the first voltage supply unit.

14. The apparatus according to claim 11, each exposure device further comprises a heat radiating unit that radiates heat generated from the first voltage supply unit.

15. The apparatus according to claim 14, each exposure device further comprises:
a support member that supports the circuit board; and
a heat conducting member that connects the heat radiating unit to the support member.

* * * * *